(12) United States Patent
Duan et al.

(10) Patent No.: US 10,473,200 B2
(45) Date of Patent: Nov. 12, 2019

(54) CONTINUOUSLY VARIABLE TRANSMISSION WITH WEDGE ACTUATION MECHANISM

(71) Applicant: GM Global Technology Operations LLC, Detroit, MI (US)

(72) Inventors: Chengwu Duan, Shanghai (CN); Chunhao J. Lee, Troy, MI (US); Jian Yao, Shanghai (CN); Ying Huang, Shanghai (CN); Derek F. Lahr, Howell, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 77 days.

(21) Appl. No.: 15/829,287

(22) Filed: Dec. 1, 2017

(65) Prior Publication Data
US 2019/0170231 A1  Jun. 6, 2019

(51) Int. Cl.
*F16H 3/54* (2006.01)
*F16H 37/02* (2006.01)
(Continued)

(52) U.S. Cl.
CPC ............. *F16H 37/022* (2013.01); *F16H 3/54* (2013.01); *F16H 9/24* (2013.01); *F16H 25/186* (2013.01); *F16H 61/0202* (2013.01); *F16H 61/66272* (2013.01); *F16H 63/067* (2013.01); *F16H 59/46* (2013.01); *F16H 2037/023* (2013.01); *F16H 2059/465* (2013.01); *F16H 2200/2005* (2013.01); *F16H 2200/2035* (2013.01)

(58) Field of Classification Search
CPC ... F16H 3/54; F16H 9/24; F16H 59/46; F16H 25/186; F16H 25/183; F16H 37/022; F16H 61/0202; F16H 61/66272; F16H 63/067; F16H 2037/023; F16H 2059/465; F16H 2200/2005; F16H 2200/2035
USPC .............................................. 475/209; 474/24
See application file for complete search history.

(56) References Cited

U.S. PATENT DOCUMENTS

| 977,781 A | 12/1910 | Clapp | |
| 4,515,041 A * | 5/1985 | Frank | B60W 10/06 477/43 |

(Continued)

FOREIGN PATENT DOCUMENTS

EP  1048879 B1  6/2004

*Primary Examiner* — Leslie A Nicholson, III
(74) *Attorney, Agent, or Firm* — Quinn IP Law

(57) ABSTRACT

A continuously variable transmission (CVT) comprises a shaft rotatable about an axis, and variator assembly, and an actuator mechanism. The variator assembly includes a pulley supported on the shaft and having a ramp surface, and an endless rotatable device frictionally engaged with the pulley. The ramp surface inclines in an axial direction along the axis toward the endless rotatable device. The CVT further comprises an actuator mechanism that includes a wedge component that has a wedge surface interfacing with the ramp surface, and a rotary piston operatively connected to the wedge component. The rotary piston defines a first fluid chamber pressurizable to apply a rotational force that provides relative motion between the ramp surface and the wedge surface resulting in a wedge force on the ramp surface and a clamping force of the endless rotatable device on the pulley.

9 Claims, 12 Drawing Sheets

(51) Int. Cl.
*F16H 25/18* (2006.01)
*F16H 63/06* (2006.01)
*F16H 61/662* (2006.01)
*F16H 61/02* (2006.01)
*F16H 9/24* (2006.01)
*F16H 59/46* (2006.01)

(56) References Cited

U.S. PATENT DOCUMENTS

| | | | |
|---|---|---|---|
| 4,735,598 A | 4/1988 | Moroto et al. | |
| 5,157,992 A * | 10/1992 | Hayashi | F16H 61/66254 474/28 |
| 5,184,981 A * | 2/1993 | Wittke | F16H 61/66272 474/18 |
| 5,540,048 A | 7/1996 | Larkin et al. | |
| 6,387,000 B1 | 5/2002 | Eisenbacher et al. | |
| 6,413,178 B1 * | 7/2002 | Chamberland | F16H 55/56 474/12 |
| 6,669,588 B2 * | 12/2003 | Schmid | F16H 61/66272 474/17 |
| 7,207,920 B2 | 4/2007 | Jonsson et al. | |
| 7,637,836 B2 * | 12/2009 | Watanabe | B60K 6/365 475/210 |
| 7,670,243 B2 * | 3/2010 | Miller | F16H 15/50 475/189 |
| 7,686,715 B2 | 3/2010 | Carlson et al. | |
| 7,988,573 B2 | 8/2011 | Shioiri et al. | |
| 8,858,389 B2 | 10/2014 | Lundberg et al. | |
| 9,261,187 B1 | 2/2016 | Otanez | |
| 9,777,810 B2 * | 10/2017 | Kawakami | F16H 9/18 |
| 10,054,202 B2 * | 8/2018 | Yokoyama | F16H 9/16 |
| 10,267,391 B2 | 4/2019 | Yao et al. | |
| 2002/0063000 A1 | 5/2002 | Kojima | |
| 2005/0090367 A1 | 4/2005 | Jonsson et al. | |
| 2005/0233842 A1 | 10/2005 | Shioiri et al. | |
| 2006/0009321 A1 | 1/2006 | Carlson et al. | |
| 2010/0081526 A1 * | 4/2010 | Kossack | F16H 9/14 474/13 |
| 2010/0113201 A1 | 5/2010 | Lannutti | |
| 2013/0116073 A1 | 5/2013 | Liebel et al. | |
| 2013/0196815 A1 | 8/2013 | Lundberg et al. | |
| 2015/0167802 A1 * | 6/2015 | Yoshida | F16H 37/022 475/211 |
| 2016/0131230 A1 | 5/2016 | Kawakami et al. | |
| 2016/0281847 A1 | 9/2016 | Kanayama | |
| 2017/0363184 A1 | 12/2017 | Yao et al. | |
| 2018/0080529 A1 | 3/2018 | Yao et al. | |
| 2019/0170249 A1 | 6/2019 | Huang et al. | |

* cited by examiner

CONTINUOUSLY VARIABLE TRANSMISSION WITH WEDGE ACTUATION MECHANISM

TECHNICAL FIELD

The present teachings generally include a continuously variable transmission.

BACKGROUND

Continuously variable transmissions vary a groove width of an input pulley and a groove width of an output pulley to vary the speed ratio of an input shaft to an output shaft. The groove width is typically varied by a hydraulic actuator that moves an axially-movable sheave of the pulley. Hydraulic actuation entails large pumping losses to maintain a required actuation force on the pulley. The pumping losses reduce the efficiency of the transmission.

SUMMARY

The present disclosure describes a continuously variable transmission (CVT) using a wedge mechanism to generate a clamp force. In some embodiments, this CVT has output clutch that facilitates a reverse torque. In addition, this CVT design optimizes the CVT clamp force. As a result, the present CVT minimizes line pressure during reverse operation.

In some embodiments, the CVT has a simple structure and a wider ratio coverage within a given package in comparison with other CVTs. This wedge actuated CVT significantly minimizes hydraulic line pressure, thus maximizing mechanical efficiency as a result of reduced pump loss.

The presently disclosed CVT has an actuation mechanism utilizing the mechanical advantage of a wedge and is configured in a manner to operate with minimal hydraulic pumping losses. The CVT comprises a shaft rotatable about an axis, and variator assembly, and an actuator mechanism. The variator assembly includes a pulley supported on the shaft and having a ramp surface, and an endless rotatable device frictionally engaged with the pulley. The ramp surface inclines in an axial direction along the axis toward the endless rotatable device. The CVT further comprises an actuator mechanism that includes a wedge component that has a wedge surface interfacing with the ramp surface.

In some embodiments, the CVT includes an output shaft rotatable about a first axis and a variator assembly. The variation assembly includes a pulley supported on the output shaft and defining a ramp surface and an endless rotatable device frictionally engaged with the pulley. The ramp surface inclines in an axial direction along the axis toward the endless rotatable device. A wedge component is coupled to the shaft. The wedge component defines a wedge surface shaped to mate with the ramp surface. Rotating the shaft causes the wedge component to apply a wedge force on the ramp surface. The CVT also includes a planetary gear set coupled to the output shaft and an assembly shaft coupled to the planetary gear set. The planetary gear set is coupled between the transmission shaft and the assembly shaft. The CVT also includes a stationary structure and a brake selectively coupled between the planetary gear set and the stationary structure. The brake is selectively connected to the stationary structure. As such, at least one member (e.g., the carrier) of the planetary gear set remains stationary to cause the transmission shaft and the assembly shaft to rotate in opposite directions. The planetary gear set includes a carrier. The brake has an engaged state and a disengaged state. Solely when the brake is in the engaged state, the brake couples the carrier to the stationary structure such that the carrier remains stationary to cause the transmission shaft and the assembly shaft to rotate in opposite directions. Solely when the brake is in the disengaged state, the brake is decoupled from the carrier to allow the carrier to rotate. The CVT includes a forward clutch selectively coupled to the planetary gear set. The forward clutch allows torque transfer between the transmission shaft and the assembly shaft to cause the transmission shaft and the assembly shaft to rotate in a same direction.

The CVT also includes a controller and a gear selector in communication with the controller. The controller is in communication with the brake and the forward clutch, the gear selector has a forward state, a reverse state, and a neutral state. The controller is programmed to determine that the gear selector is in the forward state and, in response to determining that the gear selector is in the forward state, the controller is programmed to command: (a) the brake to be in the disengaged state; and (b) the clutch to be in the engaged state. The controller is programmed to determine that the forward clutch is slipping and, in response to determining that the forward clutch is slipping, the controller is programmed to command the forward clutch to increase a clamping force thereof. The controller is programmed to determine that the forward clutch is not slipping and, in response to determining that the forward clutch is not slipping, the controller is programmed to adjust a clamping force exerted on the variator assembly such that a safety factor of the CVT assembly is greater than a safety factor of the forward clutch.

The controller is programmed to determine that the gear selector is in the reverse state and, in response to determining that the gear selector is in the reverse state, the controller is programmed to command: (a) the brake to be in the engaged state; and (b) the clutch to be in the disengaged state.

The controller is programmed to determine that the gear selector is in the forward state and, in response to determining that the gear selector is in the forward state, the controller is programmed to command: (a) the brake to be in the disengaged state and (b) the clutch to be in the engaged state.

In some embodiments, the CVT includes a support shaft rotatable about an axis and input shaft rotatable about the axis. The CVT also includes a variator assembly. The variator assembly includes a pulley supported on the support shaft and a pulley shaft extending from the pulley. The pulley shaft defines a ramp surface, and the pulley shaft is coaxial with the support shaft. The CVT includes an endless rotatable device frictionally engaged with the pulley and a wedge component that has a wedge surface interfacing with the ramp surface. The input shaft is coupled to the wedge component such that the input shaft and the wedge component rotate simultaneously. The CVT also includes a first thrust bearing supporting the input shaft and a second thrust bearing supporting the support shaft. The input shaft, the wedge component, and the support shaft are integrally coupled to each other so as to collectively form a one-piece structure. The CVT also includes a first roller bearing and a second roller bearing. The first roller bearing supports the input shaft, and the second roller bearing supports the support shaft.

In some embodiments, the CVT includes a support shaft rotatable about a first axis and a gear rotatable about a second axis. The gear has a plurality of gear teeth, and the first axis is spaced apart from the second axis. The CVT includes a variator assembly including a pulley supported on the support shaft and a pulley shaft extending from the pulley. The pulley shaft defines a ramp surface, and the pulley shaft is coaxial with the support shaft. The CVT includes an endless rotatable device frictionally engaged with the pulley. The CVT includes a wedge component has a wedge surface shaped to mate with the ramp surface. The wedge component has wedge teeth. The wedge teeth mesh with the gear teeth such that a rotation of the gear about the second axis causes the wedge component to rotate about the first axis. The CVT further includes a first thrust bearing supporting the support shaft and a second thrust bearing supporting the support shaft. The first axis is parallel to the second axis. The input shaft is coupled to the gear. The input shaft is configured to rotate about the second axis.

The above features and advantages and other features and advantages of the present teachings are readily apparent from the following detailed description of the best modes for carrying out the present teachings when taken in connection with the accompanying drawings.

DETAILED DESCRIPTION

Figure 1:
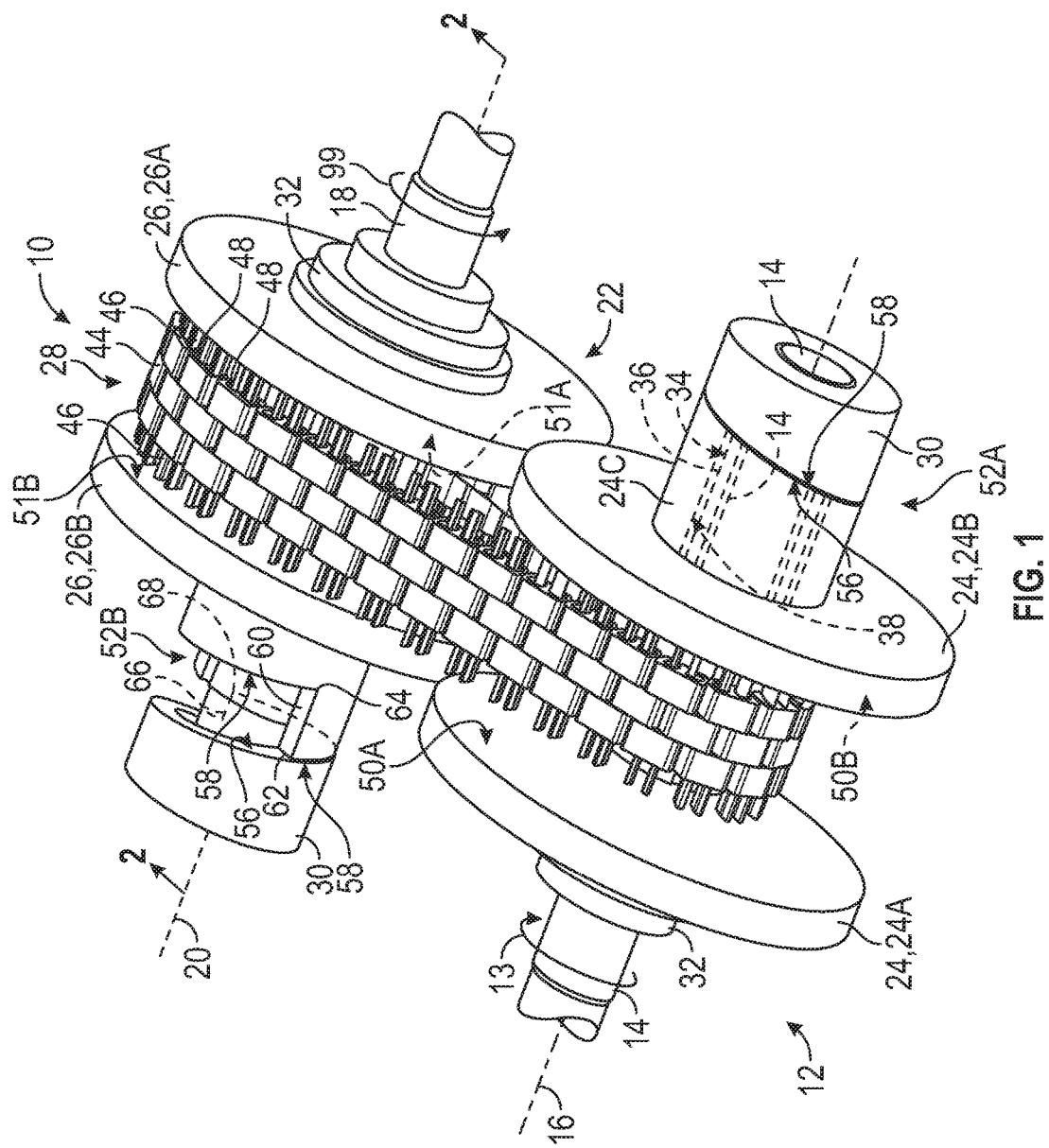
FIG. 1 is a schematic perspective illustration in partial fragmentary view of a first embodiment of a continuously variable transmission (CVT) with wedge actuators.

Referring to the drawings, wherein like components are referred to with like reference numbers, FIG. 1 shows a continuously variable transmission (CVT) 10 for a powertrain 12 of a mobile platform, such as a vehicle powertrain. The mobile platform, including by way of non-limiting examples, may be a passenger vehicle, a light-duty or heavy-duty truck, a utility vehicle, an agricultural vehicle, an industrial/warehouse vehicle, a recreational off-road vehicle, a robotic device, or an aeronautic device. The CVT 10 includes an input shaft 14 rotatable about an input axis 16, and an output shaft 18 rotatable about an output axis 20. The output axis 20 is also referred to herein as a first axis of rotation, and the input axis 16 is referred to herein as a second axis of rotation. The input axis 16 and the output axis 20 are generally parallel with one another. The powertrain 12 includes a power source (not shown) such as an engine that is operatively connected to drive the input shaft 14. The power source provides a driving torque 13 on the input shaft 14. The powertrain 12 may also include a load (also referred to as a torque load), such as vehicle wheels (not shown) driven by the output shaft 18. The input shaft 14 may be referred to as a drive shaft and the output shaft 18 may be referred to as a driven shaft.

The CVT 10 includes a variator assembly 22 that enables a controlled, continuously variable speed ratio between the input shaft 14 and the output shaft 18, and serves to transfer torque from the input shaft 14 to the output shaft 18. The variator assembly 22 includes an input pulley 24, an output pulley 26, and an endless rotatable device 28. The input pulley 24 is rotatably supported by the input shaft 14. Stated differently, the input pulley 24 is supported on the input shaft 14 and can rotate about the input axis 16. The input pulley 24 generally rotates about the input axis 16 with the input shaft 14, but is not fixed for common rotation with the input shaft 14 and can be controlled to have some rotation relative to the input shaft 14 as described herein.

As best shown in FIG. 1, the input pulley 24 includes an axially-fixed sheave 24A and an axially-movable sheave 24B. The axially-fixed sheave 24A is positioned between an axially-fixed wedge component 30, described herein, and an axially-fixed thrust bearing 32, also described herein, and thus is substantially constrained from axial movement relative to the input shaft 14 (i.e., in a direction along the input axis). The axially-movable sheave 24B is splined to an outer surface 34 of a shaft 36 of the axially-fixed sheave 24A at an inner surface 38 of the axially-movable sheave 24B, as best shown with respect to the similar components of the output pulley 26 shown and described with respect to FIG. 2. The shaft 36 of the axially-fixed sheave 24A radially surrounds the input shaft 14, extending through the endless rotatable device 28 and through an inner diameter of a pulley shaft 24C of the axially-movable sheave 24B. Both the axially-movable sheave 24B and the axially-fixed sheave 24A can be controlled to rotate in unison (i.e., together at the same speed) slightly relative to the input shaft 14 while the axially-movable sheave 24B moves axially along the input axis 16 to control a speed ratio of the input shaft 14 to the output shaft 18 and to control a clamping force of the endless rotatable device 28 on the input pulley 24, using the mechanical advantage of a wedge as described herein.

Figure 2:
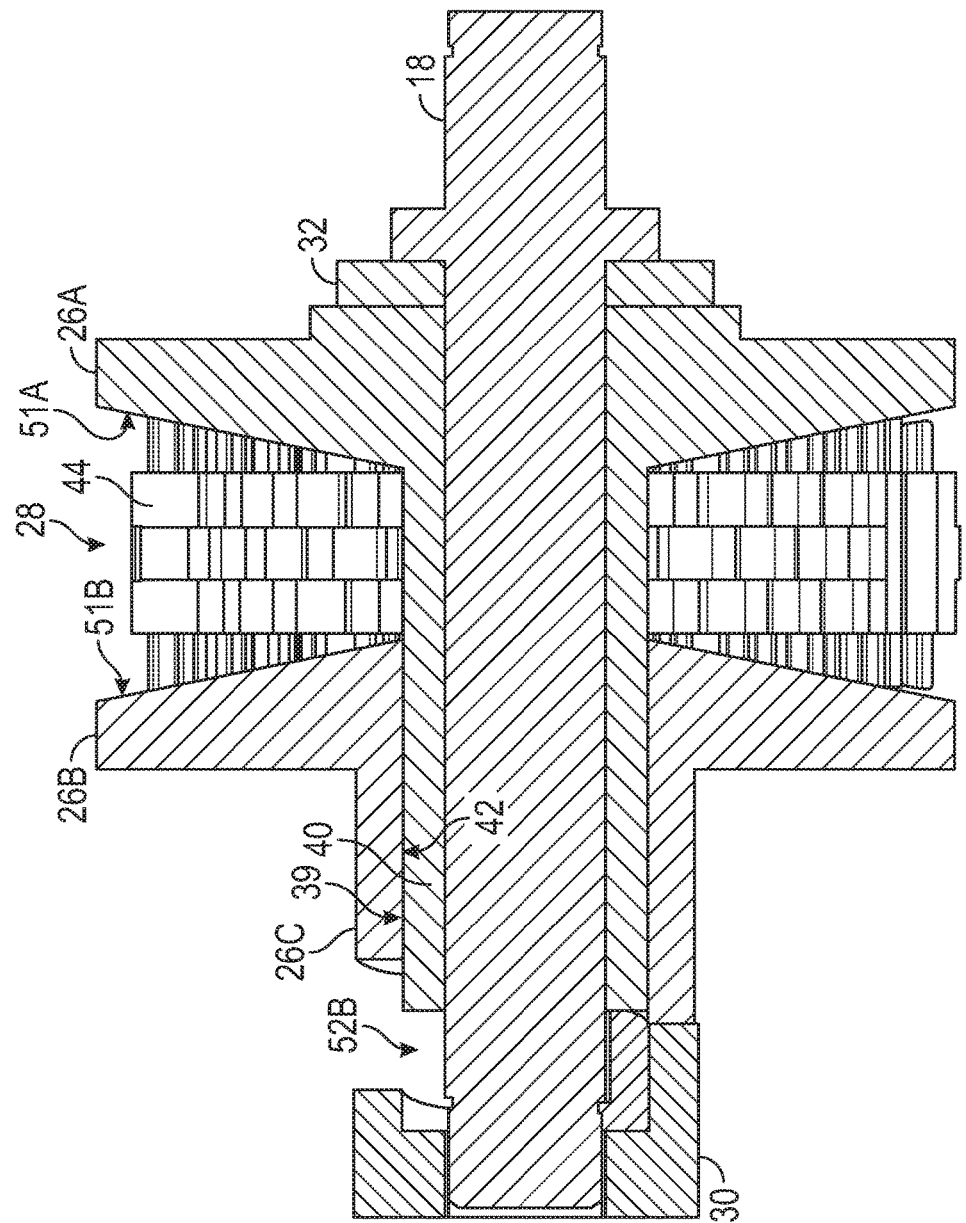
FIG. 2 is a schematic cross-sectional illustration of the CVT of FIG. 1 taken at lines 2-2 in FIG. 1

The output pulley 26 is rotatably supported by the output shaft 18. Stated differently, the output pulley 26 is supported on the output shaft 18 and can rotate about the output axis 20. The output pulley 26 generally rotates about the output axis 20 with the output shaft 18, but is not fixed for common rotation with the output shaft 18 and can be controlled to have some rotation relative to the output shaft 18 as described herein. As best shown in FIG. 2, the output pulley 26 includes an axially-fixed sheave 26A and an axially-movable sheave 26B. The axially-fixed sheave 26A is positioned between an axially-fixed wedge component 30, described herein, and an axially-fixed thrust bearing 32, also described herein, and thus is substantially constrained from axial movement relative to the output shaft 18 (i.e., in a direction along the output axis 20). The axially-fixed wedge component 30 and the axially-fixed thrust bearing 32 are identical to those disposed on the input shaft 14. Similar to the axially-movable sheave 24B of the input pulley 24, the axially-movable sheave 26B is splined to an outer surface 39 of a shaft 40 of the axially-fixed sheave 26A at an inner surface 42 of the axially-movable sheave 26B. The axially-movable sheave 26B includes a pulley shaft 26C that is splined to and extends along the shaft 40 of the axially-fixed sheave 26A. Both the axially-movable sheave 26B and the axially-fixed sheave 26A can be controlled to rotate in unison (i.e., together at the same speed) slightly relative to the output shaft 18.

Referring to FIG. 1, the endless rotatable device 28 is frictionally engaged with the input pulley 24 and with the output pulley 26. As shown, the endless rotatable device 28 includes a chain 44 that carries pins 46 in openings 48 extending through links of the chain 44. The pins 46 frictionally engage with facing frustoconical surfaces 50A, 50B, 51A, 51B of the sheaves 24A, 24B, 26A, 26B of the respective pulleys 24, 26. The frustoconical surfaces 50A, 50B define a groove of the input pulley 24, and the frustoconical surfaces 51A, 51B define a groove of the output pulley 26. Alternatively, the endless rotatable device 28 could be a belt having overlapping steel bands held by blocks having angled surfaces that interface with the pulleys 24, 26. A person of ordinary skill in the art will readily understand the construction of various suitable chains and pulleys configured for use as endless rotatable devices in a CVT.

Figure 3:
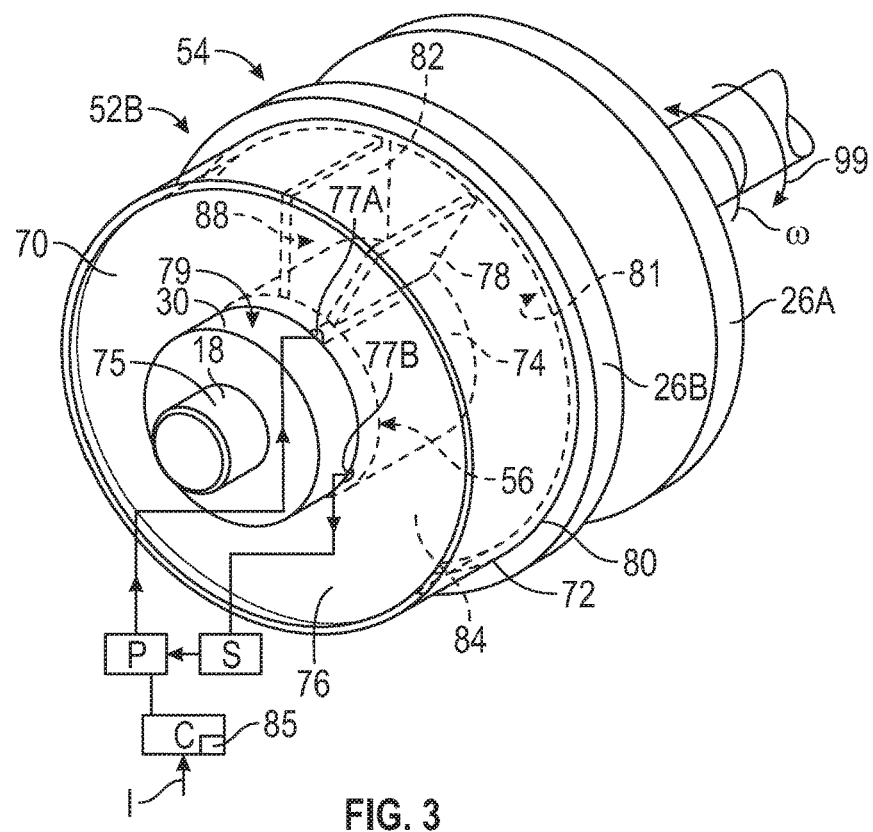
FIG. 3 is a schematic perspective illustration in partial fragmentary view of a portion of the CVT of FIG. 1 showing a rotary piston.
Figure 4:
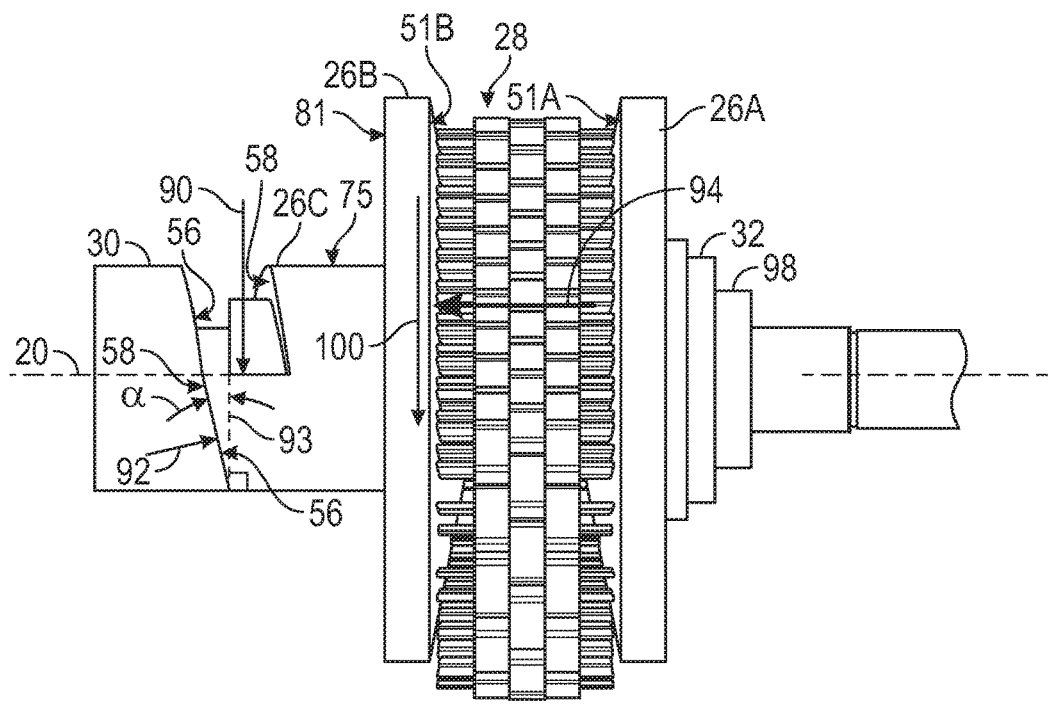
FIG. 4 is a schematic side view illustration in fragmentary view of the CVT of FIG. 1.

The CVT 10 includes an input actuator mechanism 52A operatively connected to the input pulley 24, and an identical output actuator mechanism 52B operatively connected to the output pulley 26. Each of the input actuator mechanism 52A and the output actuator mechanism 52B includes a wedge component 30 and a rotary piston 54. Only the wedge component 30 portion of each of the actuator mechanisms 52A, 52B is shown in FIG. 1, and the rotary pistons 54 are not shown in FIG. 1. The wedge component 30 of the output actuator mechanism 52B is also shown in FIGS. 2-4. The rotary piston 54 is shown in FIG. 3. The output actuator mechanism 52B is controllable to cause slight rotation of the output pulley 26 relative to the output shaft 18 and utilize the mechanical advantage of a wedge to increase clamping force of the endless rotatable device 28 on the pulley 26, adjusting the groove width to change the speed ratio while eliminating slippage. The input actuator mechanism 52A is configured and functions in an identical manner with respect to the input pulley 24 as the output actuator mechanism 52B is configured and functions with respect to the output pulley 26.

The output actuator mechanism 52B includes a wedge component 30 that has a wedge surface 56 interfacing with a ramp surface 58 of the pulley shaft 26C of the output pulley 26. The wedge surface 56 and the ramp surface 58 both incline in an axial direction along the output axis 20 toward the endless rotatable device 28. In the embodiment shown, the surfaces 56, 58 incline along a cylindrical outer diameter of the wedge component 30 and of the output shaft pulley 26C, respectively (i.e., toward the right in FIG. 4). More specifically, surface 56 extends in a helix one turn completely around the perimeter of the wedge component 30, and surface 58 extends in a helix one turn around the perimeter of the pulley shaft 26C. The wedge component 30 and the output pulley shaft 26C each have a step in the axial direction between the beginning and the end of each helical surface 56, 58. FIG. 1 shows a step 60 between the beginning 62 and the end 64 of the ramp surface 58. The beginning 66 and the end 68 of the helical wedge surface 56 of the wedge component 30 are blocked from view and are represented in hidden lines in FIG. 1.

As best shown in FIG. 3, the rotary piston 54 of the output actuator mechanism 52B is operatively connected to the wedge component 30. In the embodiment of FIGS. 1-4, the rotary piston 54 includes a stationary component 70 splined to the wedge component 30 and a rotary component 72 fixed to the axially-movable sheave 26B. The stationary component 70 includes a hollow cylindrical portion 74 that mounts to the outer surface 75 of the pulley shaft 18 and partway over the outer surface 79 of the wedge component 30. The stationary component 70 also includes a radial flange 76 extending radially-outward from the cylindrical portion 74. A vane 78 extends radially outward from the cylindrical portion 74 and is fixed to the cylindrical portion 74. The stationary component 70 is referred to as stationary because it is splined to the output shaft 18 to rotate in unison with the shaft and cannot rotate relative to the output shaft 18.

The rotary component 72 includes a housing 80 fixed at one end to the axially-movable sheave 26B. A vane 82 extends radially inward from an inner surface of the housing 80. The stationary component 70 and the rotary component 72 enclose a cylindrical volume between the cover 80 and the cylindrical portion 74 and between the flange 76 and the outer side surface 81 of the axially-movable sheave 26B. The vanes 78, 82 are sized to extend radially from the cylindrical portion 74 to the housing 80 in the cylindrical volume. The vane 82 can rotate toward or away from the stationary vane 78 as the rotary component 72 rotates with the pulley 26 relative to the shaft 18. Because the wedge component 30 causes the rotary component 72 of the rotary piston 54 to move axially with the axially-movable sheave 26B as the rotary component 72 rotates, the rotary component 72 slides axially with the housing 80, and the housing 80 also pulls the axially-moveable radial flange 76 of the stationary component 70 to move axially while rotated slightly relative to the housing 80.

As best shown in FIG. 3, a first fluid chamber 84 is defined by the rotary piston 54. The first fluid chamber 84 is defined from the stationary vane 78 clockwise to the rotatable vane 82 in FIG. 3. The first fluid chamber 84 is a portion of the cylindrical volume (i.e., that portion from the fixed vane to the rotatable vane in the clockwise direction. The first fluid chamber 84 is pressurizable with a fluid to apply a rotational force on the movable vane 82. More specifically, the radial flange 76 includes a first aperture 77A and a second aperture 77B both at an inner diameter of the radial flange 76. The apertures 77A, 77B serve as a fluid inlet and as a fluid outlet, respectively. The pressurized fluid level in the first fluid chamber 84 is controlled by a controller C that receives operating parameters I such as driving torque 13 on the input shaft 14, torque 99 on the output shaft 18, driver torque demand, etc. The controller C includes a processor 85 that is configured to execute stored instructions that, based on the input I, controls a pump P that provides fluid from a fluid source S to control the volume of fluid in the fluid chamber 84, and hence the pressure on the face 88 of the vane 82 exposed to the fluid. The rotational force applied by the rotary piston 54 on the axially-movable pulley 26B is equal to fluid pressure times the surface area of the face 88 of the movable vane 82 exposed to the pressurized fluid. The rotational force urges the axially-movable pulley sheave 26B (and the axially-fixed pulley sheave 26A splined thereto) to rotate slightly (i.e., less than a full rotation) relative to the output shaft 18 and the fixed vane 78. This rotation provides relative motion between the ramp surface 58 and the wedge surface 56, resulting in a wedge force $F_{wedge}$ 92 on the ramp surface 58 and a clamping force $F_{clamp}$ 94 of the endless rotatable device 28 on the pulley 26, both indicated in FIG. 4.

The mechanical advantage of the wedge component 30 is the friction force $F_{friction}$ 100 between the endless rotatable device 28 and the frustoconical surface 51B of the output pulley 26 and has the same direction with the piston force $F_{piston}$ 90, thus the friction force $F_{friction}$ 100 helps the piston force $F_{piston}$ 90 to reduce the required actuation force. More specifically, as best shown in FIG. 4, the piston force $F_{piston}$ 90 (i.e., the rotary force of the rotary piston 54) results in a wedge force $F_{wedge}$ 92 due to the angle α of the ramp surface 58 and of the wedge surface 56 relative to a line 94 that is perpendicular to the output axis 20. The wedge force $F_{wedge}$ 92 is normal to the ramp surface 58 and has an axial component that results in axial movement of the movable sheave 26B and a clamping force $F_{clamp}$ 94 of the endless rotatable device 28 against the output pulley 26. The thrust bearing 32 positioned between the axially-fixed sheave 26A and a fixed flange 98 of the output shaft 18 reacts the axial force. The torque load 99 on the output shaft 18 is indicated as being opposite to the direction of rotation ω of the output shaft 18. A friction force $F_{friction}$ 100 between the endless rotatable device 28 and the frustoconical surface 51B of the output pulley 26 is the product of the clamping force $F_{clamp}$ and the coefficient of friction μ between the endless rotatable device 28 and the frustoconical surface 51B of the axially-movable output sheave 26B. The endless rotatable device 28 also creates a friction force along the surface 51A of the axially-fixed sheave 26A of the output pulley 26. A force balance equation of forces acting on the axially-movable sheave 26B is simplified as follows:

$$F_{piston}/F_{clamp} = \tan \alpha - \mu;$$ (EQUATION 1)

where $F_{piston}$ is the rotational 90 of the pressurized fluid on the rotary component 72 of the rotary piston 54, $F_{clamp}$ is the resulting clamping force 100 of the rotary component 72 against the axially-movable sheave 26B; α is the angle of the wedge surface 56 (and of the ramp surface 58) relative to the line 93 perpendicular to the output axis 20; and μ is the coefficient of friction between the endless rotatable device 28 and the frustoconical surface 51B of the axially-movable sheave 26B. The coefficient of friction μ is dependent on the materials of these components.

As is apparent from the above EQUATION 1, the $F_{piston}$ to maintain the clamping force $F_{clamp}$ can be very small or reduced to zero if the wedge angle is selected so that tan α is very close to or equal to the coefficient of friction μ. Stated differently, the fluid pressure in the fluid chamber 84 can be very small or reduced to zero while maintaining the axial position of the axially-movable sheave 26B after the axial position of the axially-movable sheave 26B is adjusted by the rotary piston 54 to establish a controlled position of the output pulley with a desired speed ratio between the input shaft 14 and the output shaft 18. This reduces pumping energy requirements in comparison to an actuator mechanism that requires a very high actuating fluid pressure to be maintained throughout the operation of the CVT 10 at the established speed ratio. Accordingly, the wedge surface 56, the output pulley 26, and the endless rotatable device 28 are configured so that a fluid pressure of zero in the first fluid chamber maintains a controlled position of the output pulley.

The torque load 99 on the output shaft 18, such as due to the vehicle load will be opposite to the direction of rotation of the rotary component 72 of the rotary piston 54 (i.e., opposite to the direction of relative rotation of the axially-movable pulley sheave 26B). The torque load 99 is thus in the same rotational direction as a rotary component of the wedge force $F_{wedge}$ 92 and thus reinforces the wedge force $F_{wedge}$ 92 against the axially-movable pulley sheave 26B. In a situation where the torque load 99 is in the same direction as the piston force $F_{piston}$ 90, such as when vehicle wheels operatively connected to the output shaft 18 encounter a pothole, or during engine braking, the torque load on the output shaft 18 could be in the same direction as the piston force $F_{piston}$ 90, in which case the fluid pressure can be controllably increased to maintain a wedge force $F_{wedge}$ 92 on the axially-movable pulley sheave 26B.

Referring again to FIG. 1, the axially-movable sheave 24B of the input pulley 24 also has a ramp surface 58 that inclines in an axial direction along the second axis (i.e., the input axis 16) toward the endless rotatable device 28. The endless rotatable device 28 is frictionally engaged with the input pulley 24. The input wedge component 30 has a wedge surface 56 interfacing with the ramp surface 58 of the input pulley shaft 24C the axially-movable sheave 24B. The wedge surface 56 and the ramp surface 58 of the input actuator mechanism 52A are configured and function as described with respect to the wedge surface 56 and the ramp surface 58 of the output actuator mechanism 52B. An input rotary piston (not shown) identical to the rotary piston 54 of the output actuator mechanism 52B is operatively connected to the input wedge component 30 and to the axially-movable sheave 24B and defines another fluid chamber pressurizable to apply a rotational force that provides relative motion between the ramp surface 58 of the axially-movable sheave 24B and the wedge surface 56 of the input wedge component 30 resulting in a wedge force on the ramp surface 58 of the input pulley shaft 24C and a clamping force of the endless rotatable device 28 on the input pulley 24 as described with respect to the output actuator mechanism 52B and the output pulley 26.

The input actuator mechanism 52A and the output actuator mechanism 52B can be controlled by the controller C to move the axially-movable sheaves 24B, 26B in response to operating conditions I to vary the speed ratio of the input pulley 24 to the output pulley 26. The controller C will control the fluid pressure to the fluid chamber of the input actuator mechanism 52A so that the net axial force resulting from a clamping force of the endless rotatable device 28 on the pulley 24 and the axial component of the wedge force on the axially-movable pulley sheave 24B causes the axially-movable pulley sheave 24B to move closer to the axially-fixed pulley sheave 24A if the axially-movable pulley sheave 26B is controlled to move further from the pulley sheave 26A, and further from the pulley sheave 24A if the pulley sheave 26B is controlled to move closer to the pulley sheave 26A.

Figure 5:
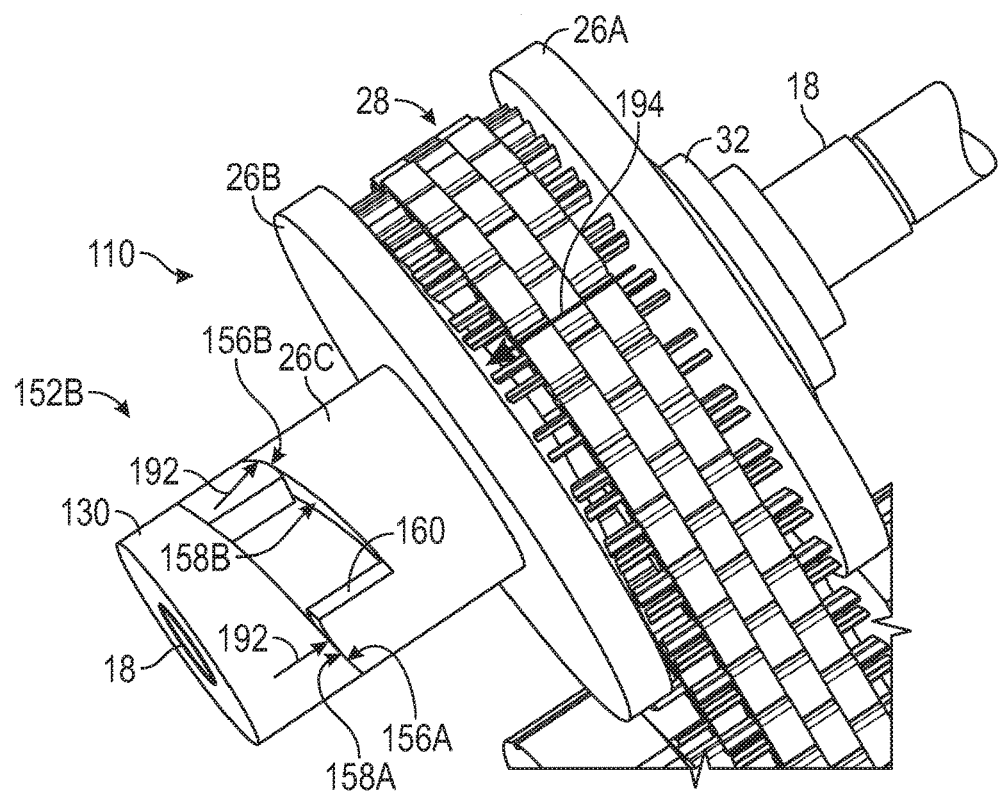
FIG. 5 is a schematic perspective illustration in partial fragmentary view of a second embodiment of a CVT with a dual wedge actuator in accordance with an alternative aspect of the present teachings.

FIG. 5 shows a portion of an alternative embodiment of a CVT 110 alike in all aspects to the CVT 10 except that an output actuator mechanism 152B (and an identical input actuator mechanism (not shown)) is modified to include a dual-wedge surface wedge component, a dual-ramp surface pulley shaft, and a two-chamber rotary piston 254 (FIG. 6) controlled by the controller C as in FIG. 3. More specifically, as shown with respect to output actuator mechanism 152B, the pulley shaft 26C has two helical ramp surfaces 158A and 158B. Unlike ramp surface 58 which winds one complete turn about the pulley shaft 26C, each of the helical ramp surfaces 158A, 158B winds only one-half way (i.e., 180 degrees) about the shaft 26C, with the ramp surface 158A starting at a rotational position at which ramp surface 158B ends and vice versa. In other words, the ramp surfaces 158A, 158B start at the same axial position 180 degrees apart from one another. For that reason, there are two steps 160 positioned 180 degrees apart from one another (only one step 160 is visible in FIG. 5).

The output actuator mechanism 152B also includes a wedge component 130 fixed to the output shaft 18 such that the wedge component 130 rotates in unison with the output shaft 18 and cannot rotate relative to the output shaft 18. The wedge component 130 is alike in all aspects to the wedge component 30, except it includes two helical wedge surfaces 156A, 156B that interface with ramp surfaces 158A and 158B, respectively. The wedge surfaces 156A, 156B of the wedge component 130 is a double helix, while the wedge surface 56 of the wedge component 30 is a single helix. Each wedge surface 156A and 156B and each ramp surface 158A, 158B must have twice the pitch as the wedge surface 56 and the ramp surface 58 in FIG. 1 in order for the axial range of movement of the pulley sheave 26B to be the same (i.e., to have the same length of the step 60 in the axial direction).

In order for a wedge force to provide a force component in the axial direction of equal magnitude to the axial force provided by the wedge force 92 of the embodiment of FIG. 1, the wedge force 192 acting on the ramp surfaces 158A, 158B must be twice that of the wedge force 92. This requires twice the actuation force. Accordingly, a rotary piston included in the output actuator mechanism 152B must have twice the rotary force as that of rotary piston 54. This can be accomplished by using a rotary piston like rotary piston 54 but having a second stationary vane 78 and a second rotary vane 82 that are 180 degrees apart from those shown in FIG. 1 to create two separate hydraulic chambers 84A, 84B as shown with respect to the embodiment of rotary piston 254 of FIG. 6. By including a second vane 82, there is twice as much total surface area that the fluid pressure acts on. A second pair of apertures 77A, 77B is provided in the radial flange 76 (FIG. 3) to enable fluid flow into and out of the second fluid chamber 84B. The second fluid chamber 84B thus increases the total area against which fluid pressure acts, thereby resulting in an additional rotational force, increasing the piston force, resulting in a wedge force 192 at each of the ramp surfaces 158A, 158B so that the sum of the wedge forces 192 is twice the magnitude to the wedge force 92 of FIG. 4. Because of the increased pitch of a double helix wedge component 130, the angle α of the ramp surface 58 and of the wedge surface 56 relative to a line 93 that is perpendicular to the output axis 20 is twice as large in the embodiments with dual chamber pistons. The axial component of the larger wedge force 192 will thus be the same as in the embodiment with a single wedge chamber and a single wedge surface 56. The wedge forces 192 result in a clamping force 194.

Figure 6:
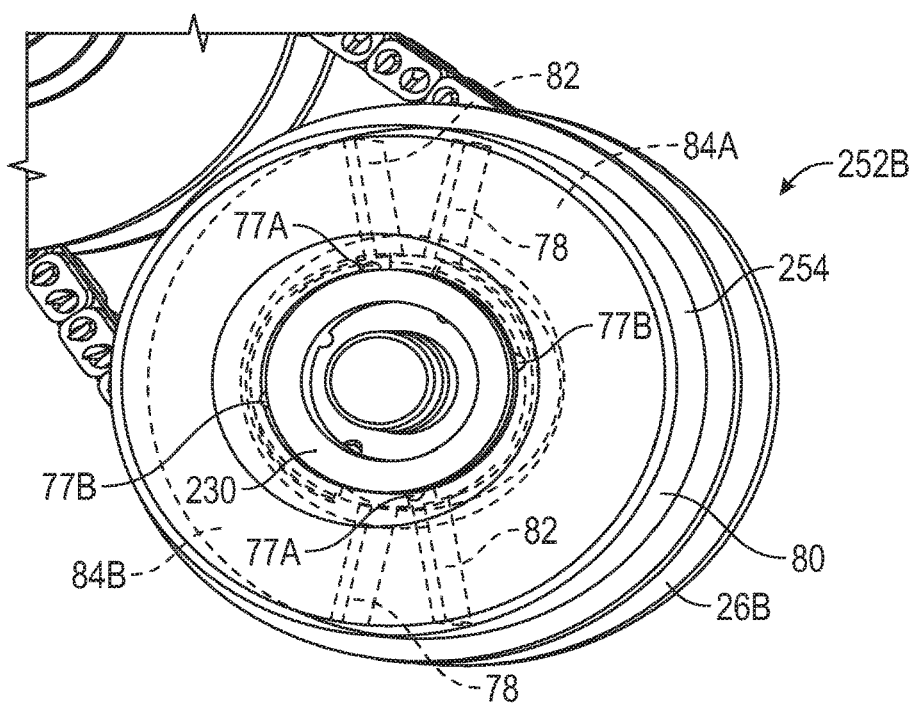
FIG. 6 is a schematic perspective illustration in fragmentary view of a two-chamber rotary piston of the CVT of FIG. 5.

FIG. 6 shows the two-chamber rotary piston 254 as described, but included in a dual-wedge output actuation mechanism 252B that includes what may be referred to as a roller-type dual wedge mechanism. The two-chamber rotary piston 254 of FIG. 6 could instead be used in the output actuation mechanism 152B and with the wedge component 130 of FIG. 5. The dual-wedge embodiment of FIGS. 6 and 7 utilizes a wedge component 230 that has two helical grooves 259A, 259B at an inner cylindrical surface of a wedge component 230. The side surface 256A, 256B of each groove 259A, 259B nearest to the endless rotatable device 28 serves as a wedge surface 256A, 256B such that there are two wedge surfaces.

Figure 7:
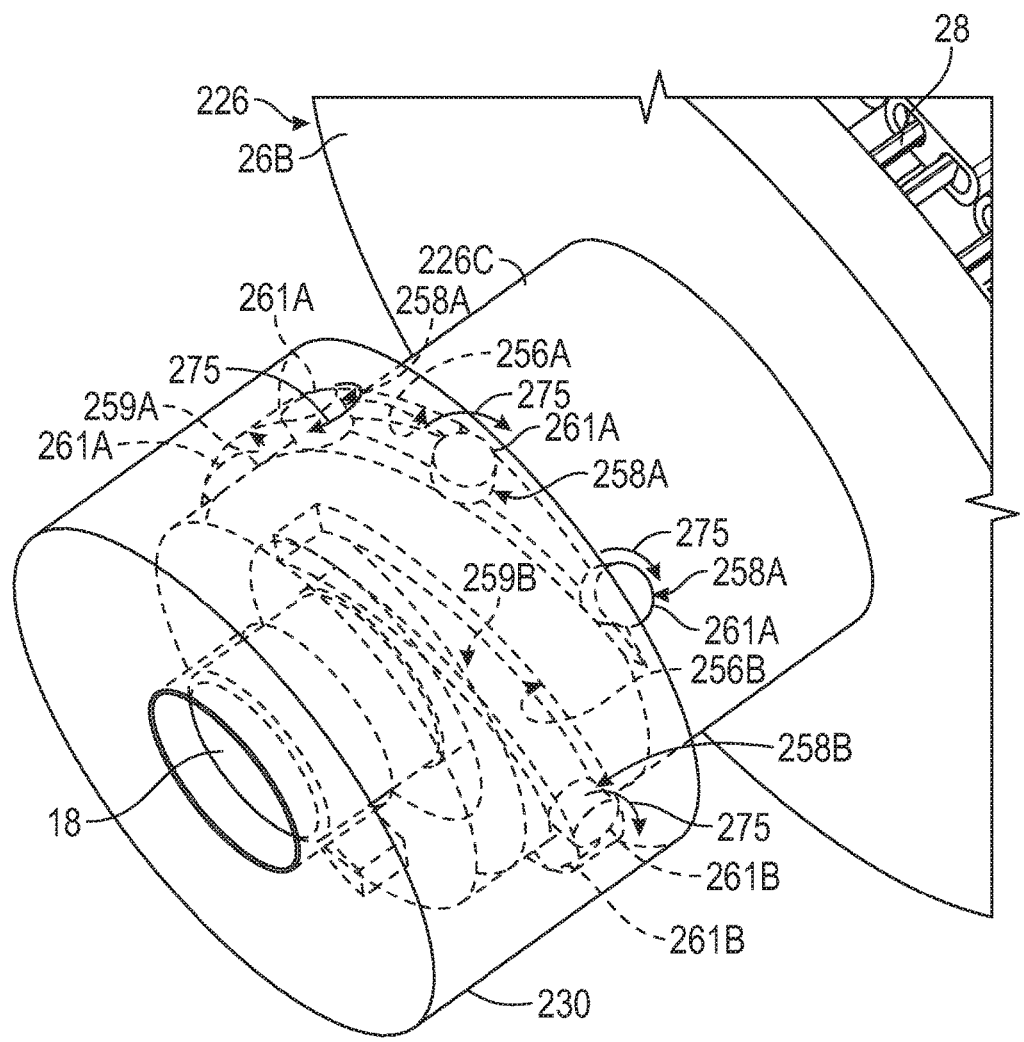
FIG. 7 is a schematic perspective illustration in fragmentary view of a third embodiment of a CVT with a dual wedge actuator in accordance with an alternative aspect of the present teachings.

FIG. 7 shows the output pulley 226 includes the axially-movable sheave 26B but with a pulley shaft 226C that extends along the axis 20 (FIG. 1) within the wedge component 230. The two-chamber rotary piston 254 is removed in FIG. 7 so that the wedge component 230 is exposed. A first helical array of rolling elements 261A and a second helical array of rolling elements 261B are secured to the pulley shaft 226C. The rolling elements 261A and 261B are spaced about the outer surface of the pulley shaft 226C such that they incline in the same axial direction as the wedge surfaces 256A, 256B. The rolling elements 261A, 261B are spaced so that rolling elements 261A are captured in the first groove 259A, and additional rolling elements 261B are captured in the second groove 259B. Only some of the rolling elements 261A, 261B are visible in FIG. 7. The rolling elements 261A, 261B are fixed in position on the pulley shaft 226C, but each spins along its center axis (as indicated by arrows 275 in FIG. 7) when the rolling elements 261A, 261B contact the wedge surfaces 256A, 256B as the axially-movable sheave 26B rotates relative to the output shaft 18 under the rotary force of the rotary piston 254. The rotary piston 254 surrounds the wedge component 230 and the pulley shaft 226C in the cylindrical space between the wedge component 230 and the cover 80 as shown in FIG. 6. The side surfaces 258A of the rolling elements 261A that contact the first wedge surface 256A in the first wedge groove 259A serve as the first ramp surface 258A. The side surfaces 258B of the rolling elements 261B that contact the second wedge surface 256B in the second wedge groove 259B serve as the second ramp surface 258B.

Figure 8:
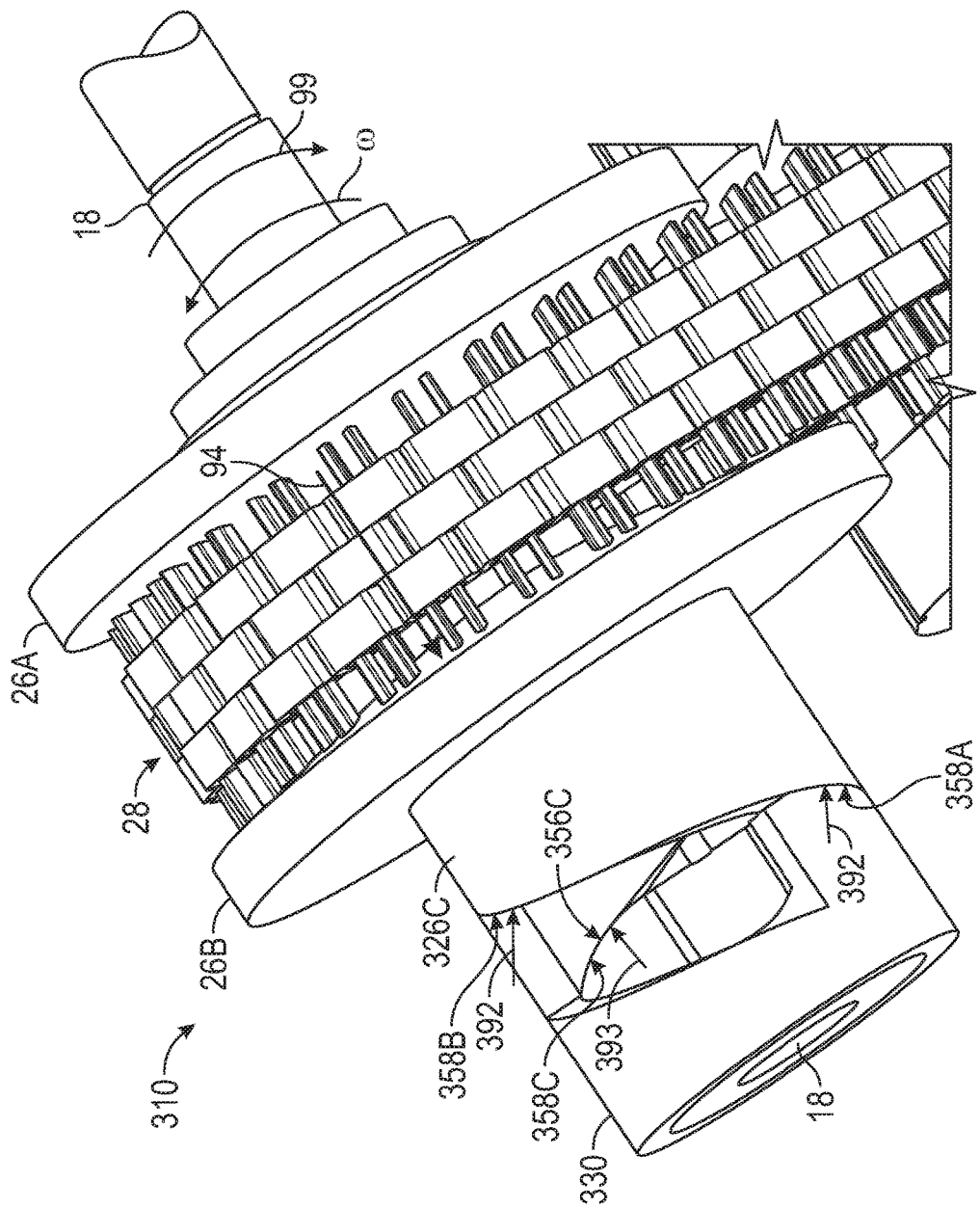
FIG. 8 is a schematic perspective illustration in fragmentary view of a fourth embodiment of a CVT in accordance with an alternative aspect of the present teachings.
Figure 9:
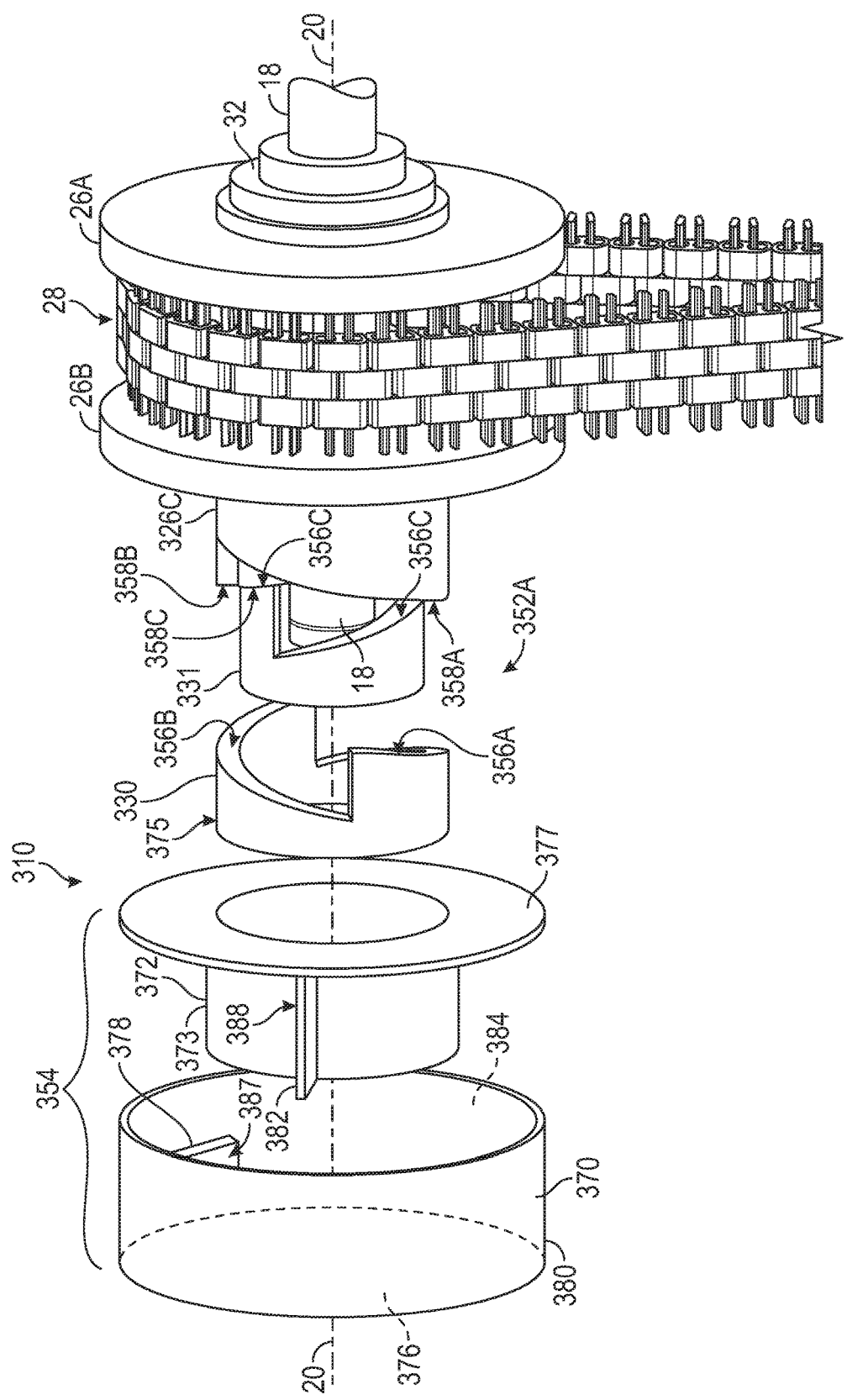
FIG. 9 is a schematic illustration in exploded perspective view of the CVT of FIG. 8.

FIGS. 8 and 9 show another embodiment of a CVT 310 having many of the same components as described with respect to the CVT 10 of FIG. 1. In this embodiment, an actuator mechanism 352A has a wedge component 330 that surrounds the pulley shaft 18 and is rotatable relative to the pulley shaft 18 in response to controlled fluid pressure in a rotary piston 354. The rotary piston 354 is controlled by the controller C in the same manner as described with respect to FIG. 1. In contrast to the other embodiments described herein, the wedge component 330 to which the stationary component 370 of the rotary piston 354 is mounted is not fixed to the shaft 18 and can rotate relative to the shaft 18. More specifically, the rotary component 372 of the rotary piston 354 is fixed to the wedge component 330 so that the wedge component 330 rotates with the rotary component 372 when fluid pressure in a fluid chamber 384 of the rotary piston 354 is controlled by the controller C to cause relative rotation of the rotary component 372 and thus phasing of the wedge component 330 relative to the pulley shaft 326C.

Similar to the actuator mechanism 152B, the wedge component 330 has two helical wedge surfaces 356A, 356B that interface with two helical ramp surfaces 358A and 358B of the pulley shaft 326C, respectively. The rotary component 372 of the rotary piston 354 has a cylindrical shaft portion 373 that surrounds and is fixed to an outer surface 375 of the rotary component 372. A radial flange 377 extends from the shaft portion 373, and a vane 382 extends radially outward from the shaft portion 373. The stationary component 370 of the rotary piston 354 is fixed to the shaft 18. More specifically, a radial flange 376 of the stationary component 370 has a central opening at which it is fixedly mounted to an additional wedge component 331. The additional wedge component 331 is in turn fixed to the output shaft 18 such that the stationary component 370 and the additional wedge component 331 rotate with but not relative to the output shaft 18.

The stationary component 370 has a stationary vane 378 that is fixed to the cover 380 of the stationary component 370 and extends radially inward. The fluid chamber 384 is defined between the rotary component 372 and the stationary component 370 from the surface 387 of the stationary vane 378 to the surface 388 of the movable vane 382. The fluid chamber 384 extends from the inner surface of the cover 380 to the outer surface of the cylindrical portion 373 and from the radial flange 376 to the radial flange 377. When assembled, the rotary piston 354 fits in a cylindrical space around the additional wedge component 331 adjacent the pulley sheave 26B. Fluid pressure in the rotary piston 354 generates wedge forces 392 at the ramp surfaces 358A, 358B as described with respect to the dual wedge surfaces 156A, 156B and wedge surface 58, resulting in a controllable clamping force of the endless rotatable device 28 on the output pulley 26. The input pulley 24 has an identical actuation mechanism operatively connected to the movable sheave 24B of the input pulley 24.

The CVT 310 of FIGS. 8 and 9 includes an additional wedge component 331 that is fixed to the output shaft 18 shaft. The additional wedge component 331 also has dual wedge surfaces. Only one wedge surface 356C is visible in FIG. 9. The dual wedge surfaces of the additional wedge component 331 form another dual helix, each wedge surface spiraling one half turn (180 degrees) around the perimeter of the additional wedge component 331 similar to the wedge surfaces 156A and 156B of the embodiment of FIGS. 5-6. The additional wedge component 331 is surrounded radially-outward by the actuation wedge component 330. The pulley shaft 326C has a second ramp surface 358C and another second ramp surface not visible in FIG. 9 that together form a dual helix. The second ramp surfaces of the pulley shaft 326C are radially-inward of the ramp surfaces 358A, 358B. The second ramp surfaces interface with wedge surfaces 356C (and the other wedge surface not shown) of the additional wedge component 331. The second ramp surfaces of the pulley shaft 326C incline in an opposite direction along the axis 20 than the ramp surfaces 358A, 358B that interface with the wedge surfaces 356A, 356B of the actuation wedge component 330. For this reason, the actuation mechanism 352A is referred to as a cross-wedge.

The actuation wedge component 330 can rotate relative to the additional wedge component 331. A bearing may be placed between the inner surface of the actuation wedge component 330 and the additional wedge component 331 to aid in this relative rotation. A torque load 99 on the output shaft 18 is in an opposite direction as the direction of rotation of the output pulley 26 under the force of the endless rotatable device 28. Accordingly, a wedge force due to this torque is indicated as wedge force 393 in FIG. 8. This wedge force 393 has a component acting in the same axial direction as the wedge forces 392 of the actuation wedge 330 and thus results in an additional clamping force of the endless rotatable device 28 against the movable sheave 26B. The wedge force 393 is generated due to the torque 99 automatically (i.e., not under the control of the controller C) and the additional wedge 331 is referred to as a self-reinforcement wedge.

In each embodiment disclosed herein, a clamping force on the movable sheave 26B is controlled and pumping losses are minimized by utilizing the mechanical advantage of wedges 30, 130, 230, 330.

Figure 10:
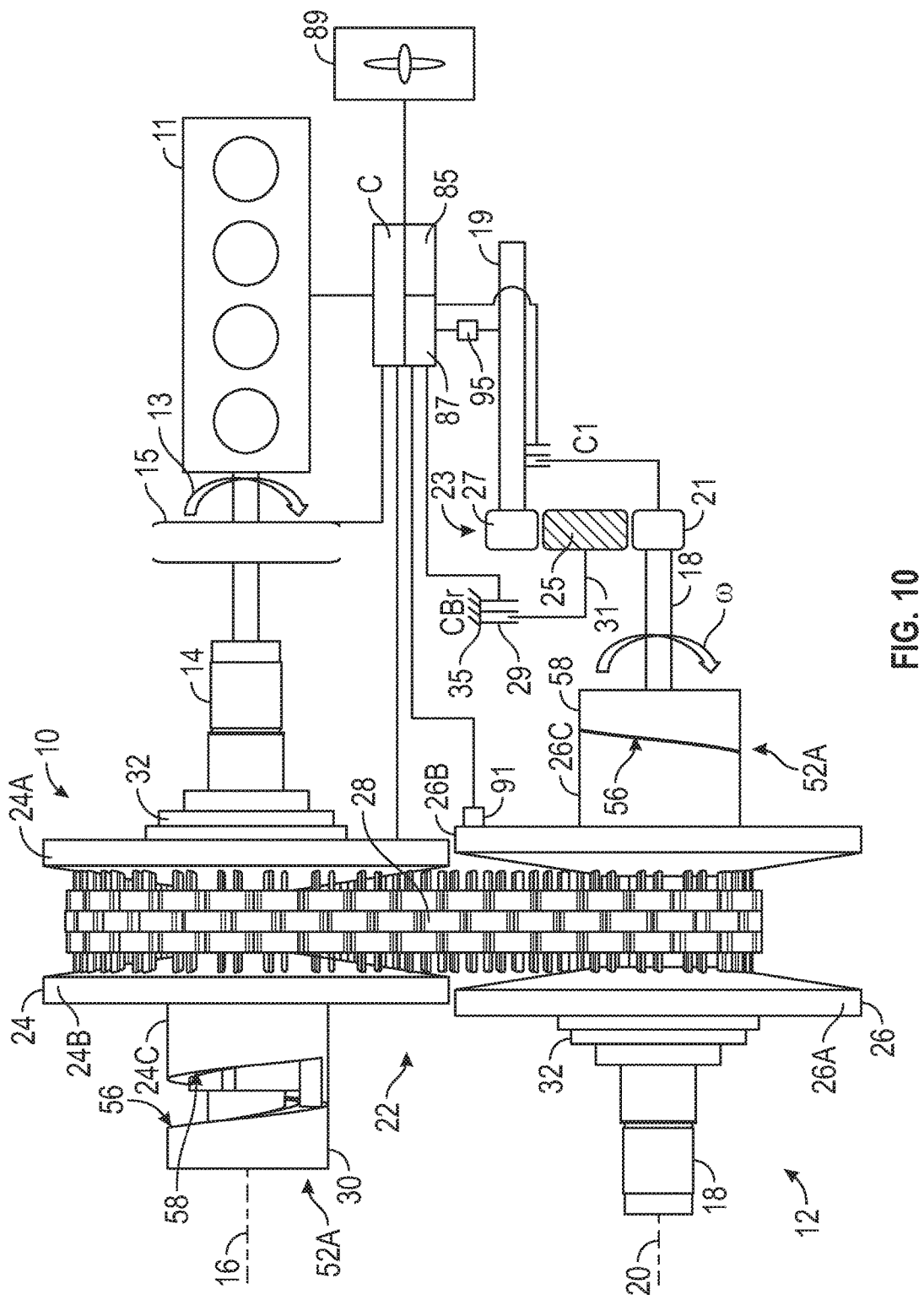
FIG. 10 is a schematic top illustration in partial fragmentary view of a fourth embodiment of a continuously variable transmission (CVT) with wedge actuators.

With reference to FIG. 10, any of the CVTs described above (e.g., CVT 10) may be coupled to an internal combustion engine 11. Therefore, in the interest of brevity, the description below only highlights the differences between this embodiment and the embodiments described above. The internal combustion engine 11 is coupled to the input shaft 14 via a torque converter 15. The torque converter 15 can therefore mechanically couple the input shaft 14 to the internal combustion engine 11. As such, the driving torque 13 of the internal combustion engine 11 can be transferred to the input shaft 14 using the torque converter 15. As with other embodiments described above, the input wedge component 30 has a wedge surface 56 shaped and sized to mate with the ramp surface 58 of the input pulley shaft 24C of the axially-movable sheave 24B. The wedge surface 56 and the ramp surface 58 of the input actuator mechanism 52A are configured and function as described with respect to the wedge surface 56 and the ramp surface 58 of the output actuator mechanism 52B. The rotation of the input shaft 14 (or the output shaft 18) causes the wedge component 30 to apply a wedge force on the ramp surface 58. The powertrain 12 may also include a load (also referred to as a torque load 99), such as vehicle wheels (not shown) driven by the output shaft 18. The input shaft 14 may be referred to as a drive shaft and the output shaft 18 may be referred to as a driven shaft.

With continued reference to FIG. 10, a planetary gear set 23 is selectively coupled to the output shaft 18 to allow the torque load 99 to be transferred from the output shaft 18 to an assembly shaft 19 through the planetary gear set 23. The planetary gear set 23 includes a sun gear 21 directly coupled to the output shaft 18 and at least one planet gear 25 meshed with the sun gear 21. In addition to the sun gear 21, the planetary gear set 23 includes a ring gear 27 meshed with the planet gear 25 and a carrier 31 coupled to the planet gear 25. The ring gear 27 is coupled to the assembly shaft 19 and, therefore, torque can be transmitted from the ring gear 27 to the assembly shaft 19. The CVT 10 also includes a brake CBr selectively coupled between at least one member (e.g., carrier 31) of the planetary gear set 23 and a stationary structure 35, such as the transmission case of the CVT 10. The CVT 10 further includes a forward clutch C1 selectively coupled between the output shaft 18 and the transmission shaft 19. The controller C includes a processor 85 and a non-transitory memory 87 in communication with the processor 85. The non-transitory memory 87 can store instructions that can be executed by the processor 85. The controller C is in communication with a gear selector 89 that is configured to receive an input from a vehicle operator. For example, the vehicle operator can use the gear selector 89 to select among a park mode, a reverse mode, a forward (or drive) mode of the CVT 10. As a result, the controller C can receive an input from the gear selector 89.

Figures 11, 12:
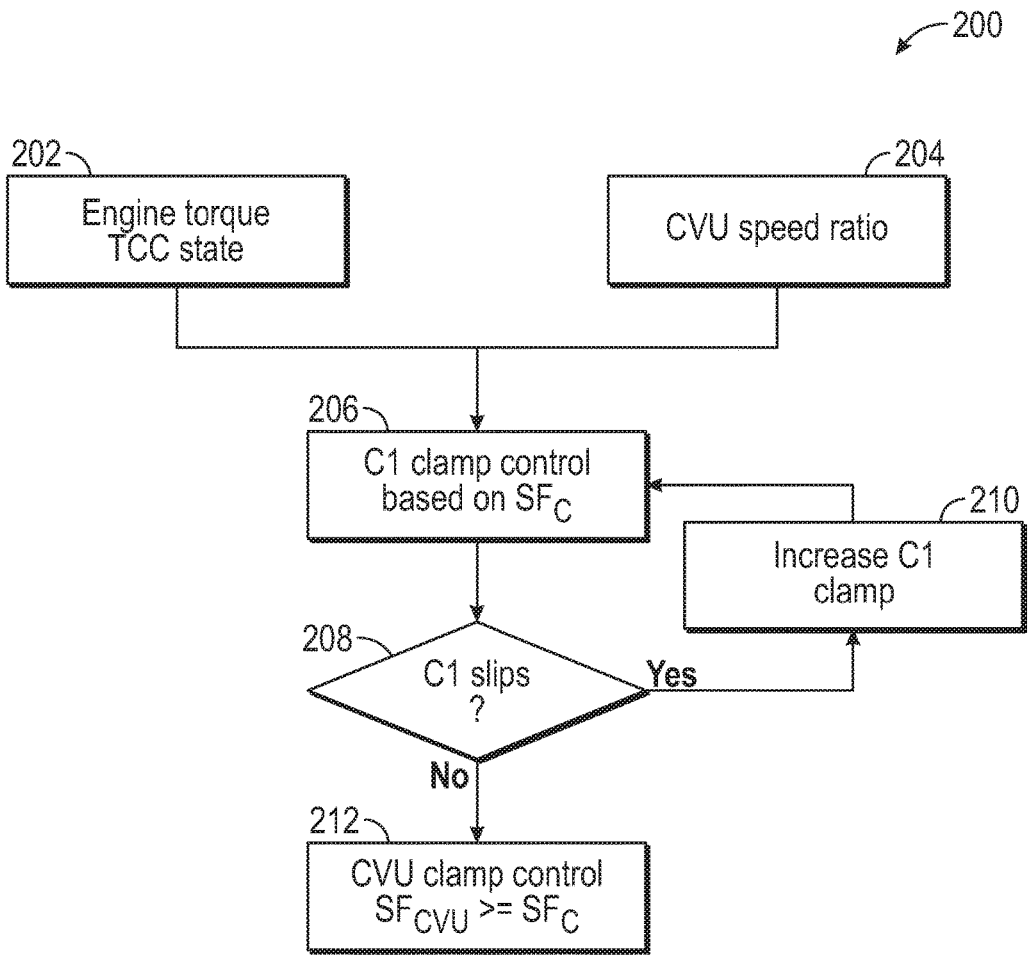
FIG. 11 is a table describing the clutch operation of the CVT shown in FIG. 10.
FIG. 12 is a flowchart of a method of controlling the CVT of FIG. 10.

With reference to FIGS. 10 and 11, the controller C is programmed to control the brake CBr and the forward clutch C1 in response to inputs from the gear selector 83. As shown in FIG. 11, solely when the controller C receives an input from the gear selector 89 that the vehicle operator desires to operate the CVT 10 in the reverse mode, the controller C commands the CBr to be in the engaged state and the forward clutch C1 to be in the disengaged state. Solely when the brake CBr is in the engaged state and the forward clutch C1 is in the disengaged state, at least one member (e.g., the carrier 31) of the planetary gear set 23 remains stationary, thereby causing the output shaft 18 and the assembly shaft 19 to rotate in opposite directions. Solely when the controller C receives an input from the gear selector 89 that the vehicle operator desires to operate the CVT 10 in the neutral mode, the controller C commands the forward clutch C1 to be in the disengaged state and the brake CBr to be in the disengaged state. As a consequence, torque is not transmitted from the output shaft 18 to the assembly shaft 19. Solely when the controller C receives an input from the gear selector 83 that the vehicle operator desires to operate the CVT 10 in the forward (or drive) mode, the controller C commands the forward clutch C1 to be in the engaged state and the brake to be in the disengaged state. As a result, all the members of the planetary gear set 23 are able to rotate, causing the output shaft 18 and the assembly shaft 19 to rotate in the same direction.

With reference to FIGS. 10, 11, and 12, the controller C is programmed to execute the method 200. In the method 200, the controller C receives inputs from the internal combustion engine 11, the torque converter 15, and the CVT 10. At step 202, the controller C receives an input from the internal combustion engine 11 indicative of the engine torque and an input from the torque converter (TC) 15 indicative of the state of the TC 15. At step 204, the controller C receives an input from the CVT 10 and/or the gear selector 89 indicative of the target CVT speed ratio. Then, the method 200 proceeds to step 206. At step 206, the controller C commands the forward clutch C1 to exert the clamping force required based on the engine torque, the state of the TC 15, the target CVT speed ratio, and the predetermined clutch safety factor $SF_c$ of the forward clutch C1. The safety factor of a clutch is determined based on the physical characteristics of the clutch, and the clamping force applied to the clutch to achieve a desired torque load is multiplied by a predetermined safety factor, because not all clutch conditions can be determined exactly by calculation. Then, the method 200 proceeds to step 208. At Step 208, the controller C determines whether the forward clutch C1 is slipping. To do so, the controller C determines the rotational speed of the output pulley 26 and/or the output shaft 18 based on an input from a first speed sensor 91 and the rotational speed of the assembly shaft 19 based on an input from a second speed sensor 95. The first speed sensor 91 is coupled to the output pulley 26 and/or output shaft 18 and can therefore measure the rotational speed of the output pulley 26 and/or output shaft 18. The second speed sensor 95 is coupled to the assembly shaft 19 and can therefore measure the rotational speed of the transmission shaft 19. Then, the controller C compares the rotational speed of the output pulley 26 and/or the output shaft 18 with the rotational speed of the assembly shaft 19. For instance, the controller C can determine the difference between rotational speed of the output pulley 26 and/or the output shaft 18 and the rotational speed of the assembly shaft 19. If and solely if the difference between rotational speed of the output pulley 26 and/or the output shaft 18 with the rotational speed of the assembly shaft 19 is greater than a predetermined speed threshold, then the controller C determines that the forward clutch C1 is slipping. If and solely if the difference between rotational speed of the output pulley 26 and/or the output shaft 18 with the rotational speed of the assembly shaft 19 is equal to or less than the predetermined speed threshold, then the controller C determines that the forward clutch is not slipping. If and solely if the controller C determines that the forward clutch C1 is slipping at step 208, then the method proceeds to step 210. At step 210, the controller C commands the CVT 10 to increase the clamping force exerted by the forward clutch C1. If, and solely if, the controller C determines that the forward clutch C1 is not slipping at step 208, then the method 200 proceeds to step 212. At step 212, the controller C commands the CVT 10 to adjust a clamping force exerted on the variator assembly 22 such that a CVT safety factor of the $SF_{CVT}$ is greater than the clutch safety factor $SF_C$ of the forward clutch C1 at step 212. The safety factor of a CVT is determined based on the CVT physical characteristics, and the clamping force applied to the clutch to achieve a desired torque load is multiplied by a predetermined safety factor, because not all clutch conditions can be determined exactly by calculation.

Figure 13:
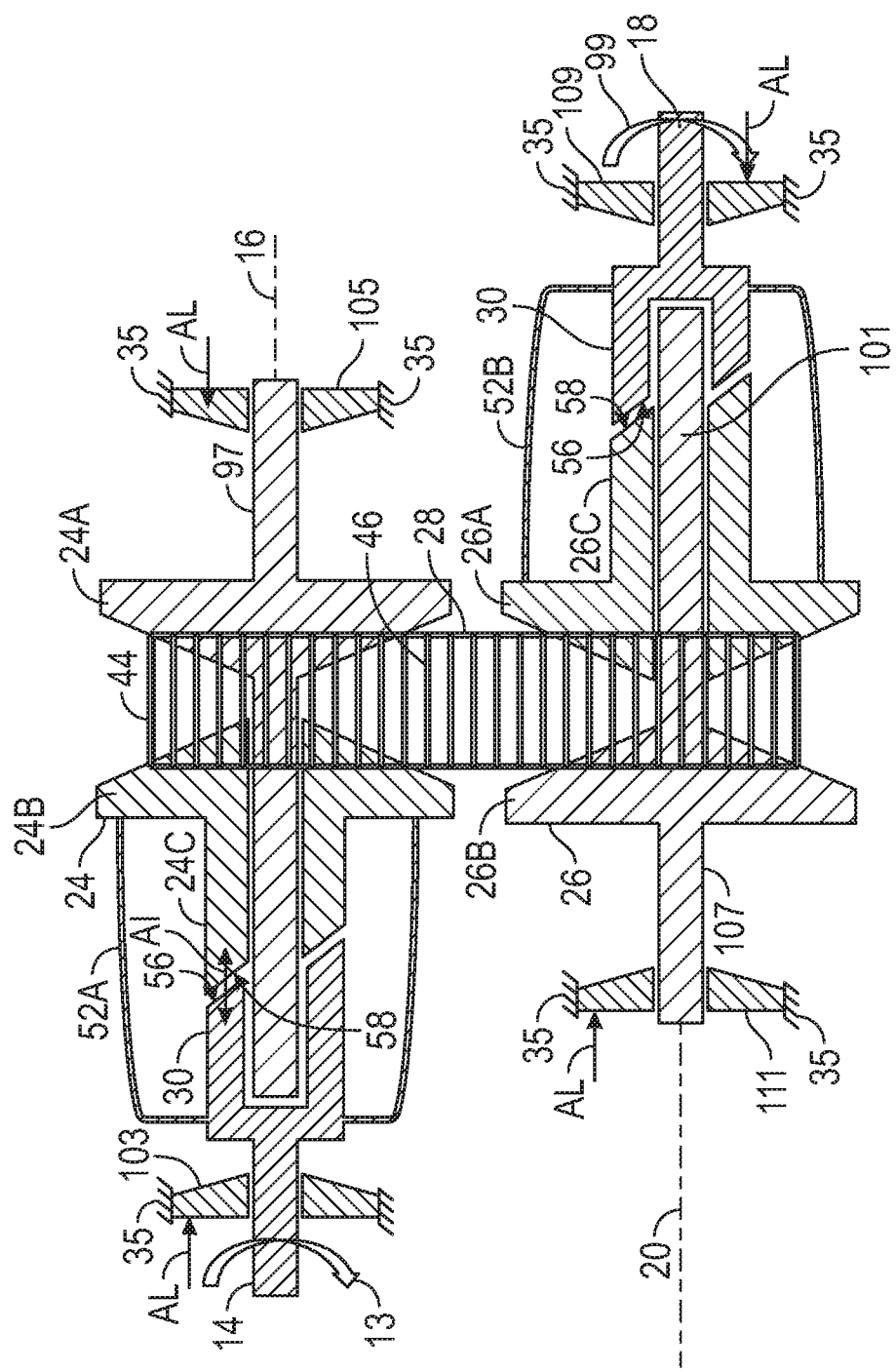
FIG. 13 is schematic top illustration in partial fragmentary view of a fifth embodiment of a continuously variable transmission (CVT) with wedge actuators.

With reference to FIG. 13, the CVT 10 includes an input shaft 14 rotatable about an input axis 16, and an output shaft 18 rotatable about an output axis 20. The structure and operation of the CVT 10 illustrated in FIG. 13 and the CVT 10 described above are substantially similar. Thus, in the interest of brevity, the description below merely highlights the differences between CVT 10 illustrated in FIG. 13 and the CVTs 10 described above. In this embodiment, a first support shaft 97 is mechanically coupled to the axially-fixed sheave 24A. The first support shaft 97 supports the axially-fixed sheave 24A and the pulley shaft 24C of the axially-movable sheave 24B. Further, the first support shaft 97 extends through the axially-fixed sheave 24A, the axially-movable sheave 24B, and the pulley shaft 24C. Accordingly, the first support shaft 97 is coaxial with the pulley shaft 24C. The input actuator mechanism 52A is operatively coupled to the axially-movable sheave 24B. As such, the input actuator mechanism 52A is configured to exert a clamping force on the axially-movable sheave 24B to move the axially-movable sheave 24B along the input axis 16 as indicated by double arrows AI. The axially-fixed wedge component 30 is integrally coupled to the input shaft 14 so as to form a one-piece structure. Accordingly, the input shaft 14 and the wedge component 30 rotate simultaneously. The wedge component 30 a wedge surface 56 interfacing and mating with the ramp surface 58 of the pulley shaft 24C of the input pulley 24. The wedge surface 56 and the ramp surface 58 both incline in an axial direction along the input axis 16 toward the endless rotatable device 28.

With continued reference to FIG. 13, the CVT 10 includes a first thrust bearing 103 directly coupled to the input shaft 14 and a stationary structure 35, such as the transmission case of the CVT 10 in order to allow rotation of the input shaft 14 while supporting axial loads AL parallel to the input axis 16. Accordingly, the first thrust bearing 103 supports the input shaft 14. The CVT 10 further includes a second thrust bearing 105 directly coupled to the first support shaft 97 and the stationary structure 35 (e.g., transmission case) to allow rotation of the first support shaft 97 while supporting axial loads AL parallel to the input shaft 16.

With continued reference to FIG. 13, in the output pulley 26, a second support shaft 107 is mechanically coupled to the axially-fixed sheave 26A. The second support shaft 107 supports the axially-fixed sheave 26A and the pulley shaft 26C of the axially-movable sheave 26B. Further, the second support shaft 107 extends through the axially-fixed sheave 26A, the axially-movable sheave 26B, and the pulley shaft 26C. Accordingly, the second support shaft 107 is coaxial with the pulley shaft 26C. The output actuator mechanism 52B is operatively coupled to the axially-movable sheave 26B. As such, output actuator mechanism 52B is configured to exert a clamping force on the axially-movable sheave 26B to axially move the axially-movable sheave 26B. The axially-fixed wedge component 30 is integrally coupled to the output shaft 18 so as to form a one-piece structure. Accordingly, the output shaft 18 and the wedge component 30 rotate simultaneously. The wedge component 30 a wedge surface 56 interfacing and mating with the ramp surface 58 of the pulley shaft 26C of the output pulley 26. The wedge surface 56 and the ramp surface 58 both incline in an axial direction along the input axis 16 toward the endless rotatable device 28.

With continued reference to FIG. 13, the CVT 10 includes a third thrust bearing 109 directly coupled to the output shaft 18 and the stationary structure 35 (e.g., the transmission case of the CVT 10) in order to allow rotation of the output shaft 18 while supporting axial loads AL parallel to the output axis 20. Accordingly, the third thrust bearing 109 supports the output shaft 18. The CVT 10 further includes a fourth thrust bearing 111 directly coupled to the second support shaft 107 and the stationary structure 35 (e.g., transmission case) to allow rotation of the second support shaft 107 while supporting axial loads AL parallel to the output shaft 18.

Figure 14:
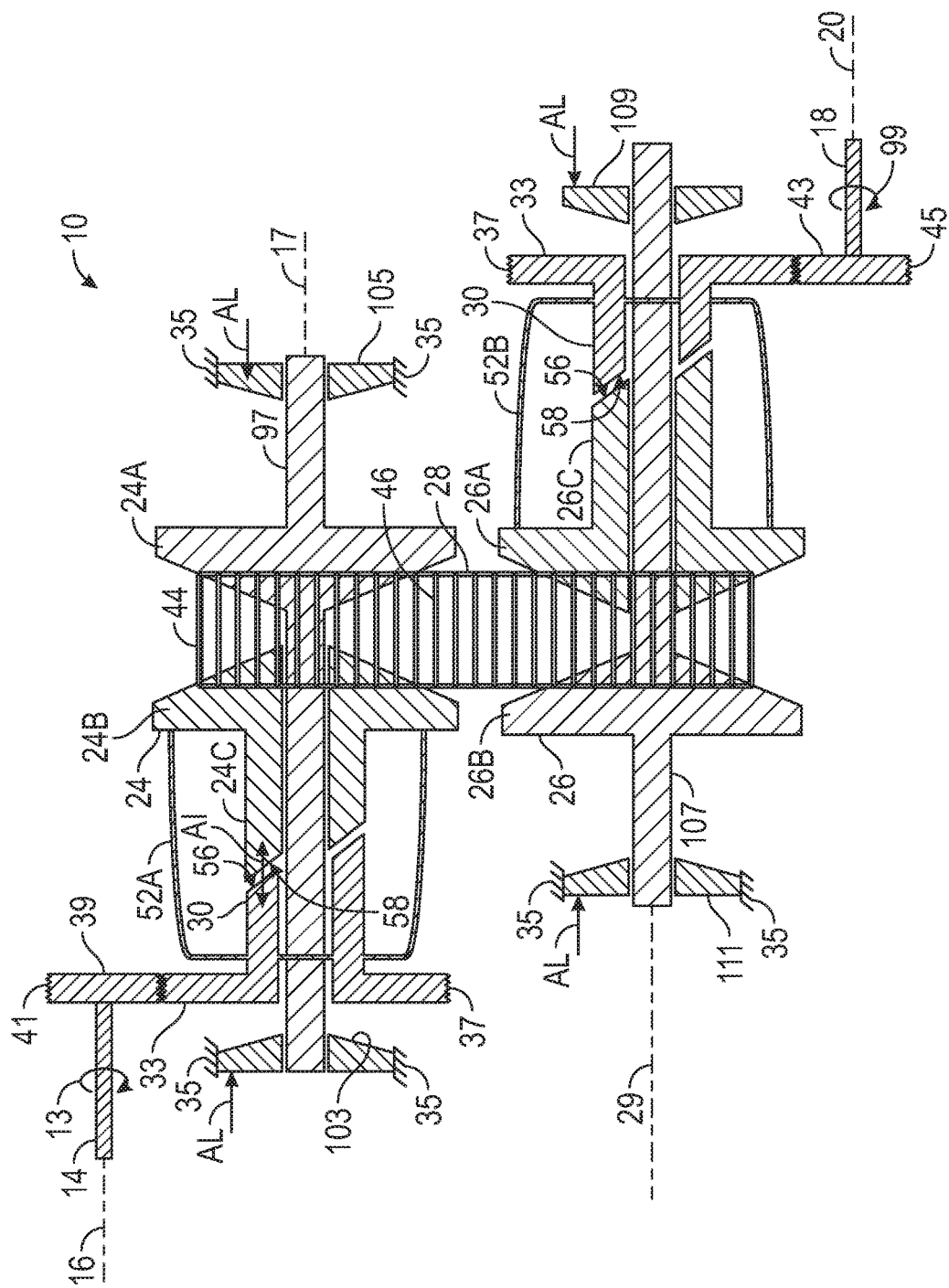
FIG. 14 is schematic top illustration in partial fragmentary view of a fifth embodiment of a continuously variable transmission (CVT) with wedge actuators.

With reference to FIG. 14, the CVT 10 includes an input shaft 14 rotatable about an input axis 16, and an output shaft 18 rotatable about an output axis 20. The structure and operation of the CVT 10 illustrated in FIG. 13 and the CVT 10 described above are substantially similar. Thus, in the interest of brevity, the description below merely highlights the differences between CVT 10 illustrated in FIG. 14 and the CVTs 10 described above. In this embodiment, a first support shaft 97 is mechanically coupled to the axially-fixed sheave 24A. The first support shaft 97 supports the axially-fixed sheave 24A and the pulley shaft 24C of the axially-movable sheave 24B. Further, the first support shaft 97 extends through the axially-fixed sheave 24A, the axially-movable sheave 24B, and the pulley shaft 24C. Accordingly, the first support shaft 97 is coaxial with the pulley shaft 24C. The input actuator mechanism 52A is operatively coupled to the axially-movable sheave 24B. As such, input actuator mechanism 52A is configured to exert a clamping force on the axially-movable sheave 24B to move the axially-movable sheave 24B along the input axis 16. The axially-fixed wedge component 30 functions as a layshaft and therefore includes a geared portion 33 with gear teeth 37. The gear teeth 37 extend along the entire circumference of the geared portion 33. The CVT 10 also includes an input gear 39 with input gear teeth 41. The input gear teeth 41 extend along the entire circumference of the input gear 39. The input shaft 14 is directly coupled to the input gear 39 such that the input shaft 14 and the input gear 39 rotate simultaneously. The wedge teeth 37 mesh with the input gear teeth 41. Thus, rotating the input gear 39 about the input axis 16 causes the wedge component 30 to rotate about the first offset axis 17. The first offset axis 17 is parallel to (and spaced apart from) the input axis 16 to optimize torque transmission between the geared portion 33 and the input gear 39. The wedge component 30 a wedge surface 56 interfacing and mating with the ramp surface 58 of the pulley shaft 24C of the input pulley 24. The wedge surface 56 and the ramp surface 58 both incline in an axial direction along the input axis 16 toward the endless rotatable device 28.

With continued reference to FIG. 14, the CVT 10 includes a first thrust bearing 103 directly coupled to the input shaft 14 and a stationary structure 35, such as the transmission case of the CVT 10 in order to allow rotation of the input shaft 14 while supporting axial loads AL parallel to the input axis 16. Accordingly, the first thrust bearing 103 supports the input shaft 14. The CVT 10 further includes a second thrust bearing 105 directly coupled to the first support shaft 97 and the stationary structure 35 (e.g., transmission case) to allow rotation of the first support shaft 97 while supporting axial loads AL parallel to the input shaft 16.

With continued reference to FIG. 14, in the output pulley 26, a second support shaft 107 is mechanically coupled to the axially-fixed sheave 26A. The second support shaft 107 supports the axially-fixed sheave 26A and the pulley shaft 26C of the axially-movable sheave 26B. Further, the second support shaft 107 extends through the axially-fixed sheave 26A, the axially-movable sheave 26B, and the pulley shaft 26C. Accordingly, the second support shaft 107 is coaxial with the pulley shaft 26C. The output actuator mechanism 52B is operatively coupled to the axially-movable sheave 26B. As such, output actuator mechanism 52B is configured to exert a clamping force on the axially-movable sheave 26B to axially move the axially-movable sheave 26B. The axially-fixed wedge component 30 functions as a layshaft and therefore includes a geared portion 33 with gear teeth 37. The gear teeth 37 extend along the entire circumference of the geared portion 33. The CVT 10 also includes an output gear 43 with output gear teeth 45. The output gear teeth 45 extend along the entire circumference of the output gear 43. The output shaft 18 is directly coupled to the output gear 43 such that the output shaft 18 and the output gear 43 rotate simultaneously about the output axis 20. The wedge teeth 37 mesh with the input gear teeth 41. Thus, rotating the input gear 39 about the output axis 20 causes the wedge component 30 to rotate about the second offset axis 29. The second offset axis 29 is parallel to (and spaced apart from) the output axis 20 to optimize torque transmission between the geared portion 33 and the input gear 39. The wedge component 30 includes a wedge surface 56 interfacing and mating with the ramp surface 58 of the pulley shaft 26C of the output pulley 26. The wedge surface 56 and the ramp surface 58 both incline in an axial direction along the first offset axis 17 toward the endless rotatable device 28.

With continued reference to FIG. 14, the CVT 10 includes a third thrust bearing 109 directly coupled to the output shaft 18 and the stationary structure 35 (e.g., the transmission case of the CVT 10) in order to allow rotation of the output shaft 18 while supporting axial loads AL parallel to the output axis 20. Accordingly, the third thrust bearing 109 supports the output shaft 18. The CVT 10 further includes a fourth thrust bearing 111 directly coupled to the second support shaft 107 and the stationary structure 35 (e.g., transmission case) to allow rotation of the second support shaft 107 while supporting axial loads AL parallel to the output shaft 18.

Figure 15:
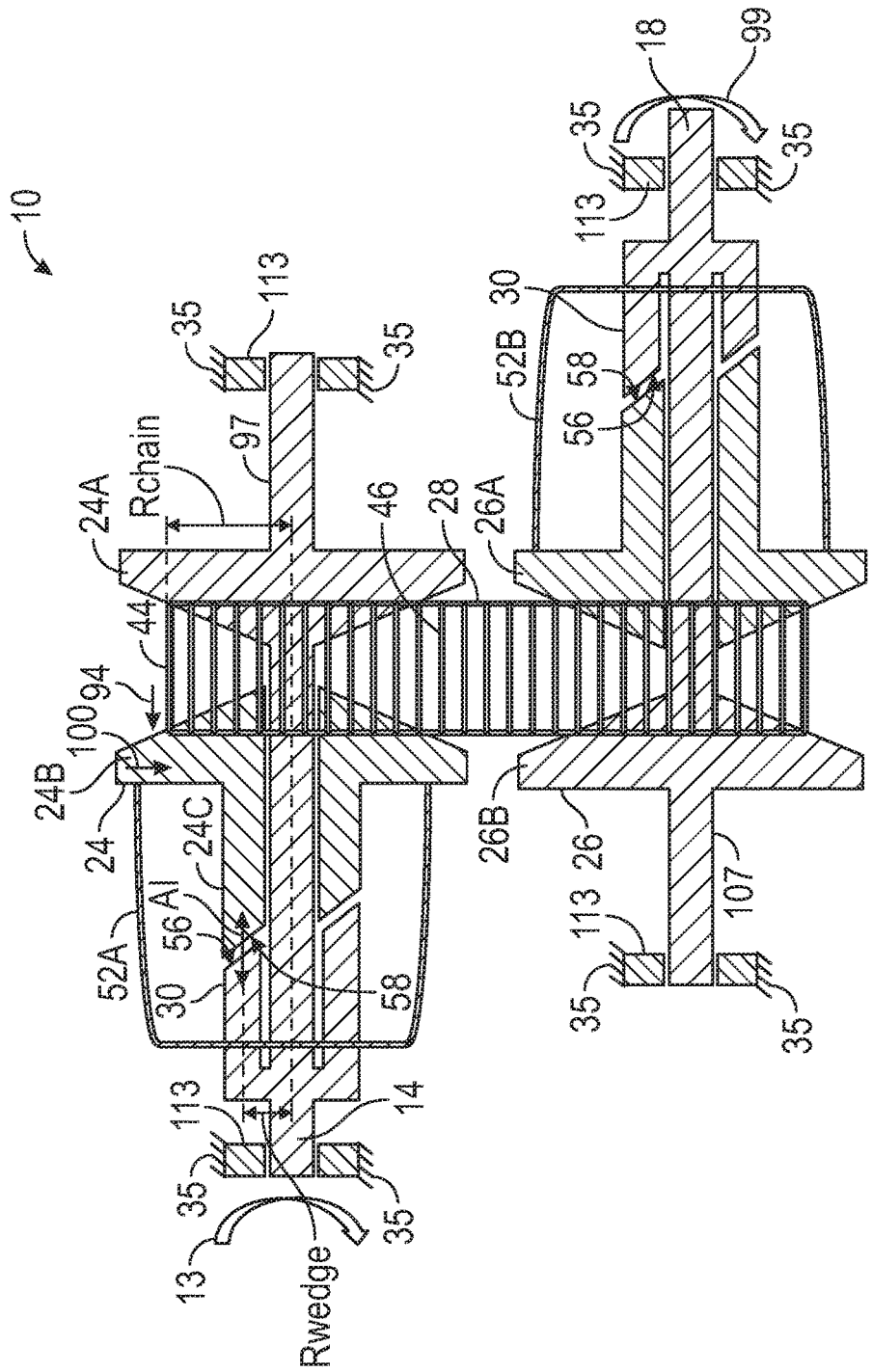
FIG. 15 is schematic top illustration in partial fragmentary view of a fifth embodiment of a continuously variable transmission (CVT) with wedge actuators

With reference to FIG. 15, the structure and operation of the CVT 10 illustrated herein is substantially similar to the structure and operation of the CVT 10 described above with respect to FIG. 13. However, in this embodiment, in the input pulley 24, the input shaft 14, the wedge component 30, and the first support shaft 97 are integrally coupled to each other so as to collectively form a one-piece structure to enhance the structural integrity of the CVT 10. In the output pulley 26, the output shaft 18, the wedge component 30, and the second support shaft 107 are integrally coupled to each other so as to collectively form a one-piece structure to enhance the structure integrity of the CVT 10. Instead of thrust bearings, the CVT 10 includes roller bearings 113 supporting the first support shaft 97 and the second support shaft 107.

The mechanical advantage of the wedge component 30 is the friction force $F_{friction}$ 100 between the endless rotatable device 28 and the frustoconical surface 51B of the output pulley 26 and has the same direction with the piston force $F_{piston}$ 90, thus the friction force $F_{friction}$ 100 helps the piston force $F_{piston}$ 90 to reduce the required actuation force. More specifically, as best shown in FIG. 4, the piston force $F_{piston}$ 90 (i.e., the rotary force of the rotary piston 54) results in a wedge force $F_{wedge}$ 92 due to the angle α of the ramp surface 58 and of the wedge surface 56 relative to a line 94 that is perpendicular to the output axis 20. The wedge force $F_{wedge}$ 92 is normal to the ramp surface 58 and has an axial component that results in axial movement of the movable sheave 26B and a clamping force $F_{clamp}$ 94 of the endless rotatable device 28 against the output pulley 26. The thrust bearing 32 positioned between the axially-fixed sheave 26A and a fixed flange 98 of the output shaft 18 reacts the axial force. The torque load 99 on the output shaft 18 is indicated as being opposite to the direction of rotation ω of the output shaft 18. A friction force $F_{friction}$ 100 between the endless rotatable device 28 and the frustoconical surface 51B of the output pulley 26 is the product of the clamping force $F_{clamp}$ and the coefficient of friction μ between the endless rotatable device 28 and the frustoconical surface 51B of the axially-movable output sheave 26B. The endless rotatable device 28 also creates a friction force along the surface 51A of the axially-fixed sheave 26A of the output pulley 26. A force balance equation of forces acting on the axially-movable sheave 26B is simplified as follows:

$$\frac{Fpiston}{Fclamp} = K = \left(1 - \frac{2*\mu}{Rwedge}\frac{Rchain}{\tan(\alpha)}\right) \quad \text{(EQUATION 2)}$$

$F_{piston}$ is the rotational force 94 of the pressurized fluid on the rotary component 72 of the rotary piston 54. $F_{piston}$ can be also generated by regular linear piston. $F_{clamp}$ is the resulting clamping force 100 of the rotary component 72 against the axially-movable sheave 26B or 24B. α is the angle of the wedge surface 56 (and of the ramp surface 58) relative to the line 93 perpendicular to the output axis 20 or the input axis 14. μ is the coefficient of friction between the endless rotatable device 28 and the frustoconical surface 51B of the axially-movable sheave 26B or 24B. $R_{chain}$ is a distance from a midpoint of the first support shaft 97 or the second support shaft 107 to the location in which the endless rotation device 28 contacts the axially-fixed sheave 24A or 26A. $R_{wedge}$ is a distance from a midpoint of the first support shaft 97 or the second support shaft 107 to the location in which the endless rotation device 28 contacts the axially-fixed sheave 24A or 26A. The coefficient of friction μ is dependent on the materials of these components As is apparent from the above EQUATION 2, the angle α of the wedge surface 56 (and of the ramp surface 58) relative to the line 93 perpendicular to the output axis 20 or the input axis 14 can be defined by the following equation:

$$\alpha = \text{atan}\left(\frac{2*\mu}{Rwedge}\frac{Rchain}{(1-K)}\right) \quad \text{(EQUATION 3)}$$

The angle α of the wedge surface 56 (and of the ramp surface 58) relative to the line 93 perpendicular to the output axis 20 or the input axis 14 can be designed for self-lock at maximum overdrive or underdrive ratio, y by defining a negative K.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A continuously variable transmission comprising:
   an output shaft rotatable about an axis;
   a variator assembly including:
     a pulley supported on the output shaft and defining a ramp surface;
     an endless rotatable device frictionally engaged with the pulley, wherein the ramp surface inclines in an axial direction along the axis toward the endless rotatable device;
     a wedge component coupled to the output shaft, wherein the wedge component defines a wedge surface shaped to mate with the ramp surface, and a rotation of the output shaft causes the wedge component to apply a wedge force on the ramp surface;
   a planetary gear set coupled to the output shaft;
   an assembly shaft coupled to the planetary gear set, wherein the planetary gear set is coupled between the output shaft and the assembly shaft;
   a stationary structure; and
   a brake selectively coupled between the planetary gear set and the stationary structure, wherein the brake is selectively connected to the stationary structure such that at least one member of the planetary gear set remains stationary to cause the output shaft and the assembly shaft to rotate in opposite directions;
   wherein the planetary gear set includes a carrier, the brake has an engaged state and a disengaged state, solely when the brake is in the engaged state, the brake couples the carrier to the stationary structure such that the carrier remains stationary to cause the output shaft and the assembly shaft to rotate in opposite directions.

2. The continuously variable transmission of claim 1, wherein, solely when the brake is in the disengaged state, the brake is decoupled from the carrier to allow the carrier to rotate.

3. The continuously variable transmission of claim 2, further comprising a forward clutch selectively coupled to the planetary gear set, wherein the forward clutch allows torque transfer between the output shaft and the assembly shaft to cause the output shaft and the assembly shaft to rotate in a same direction.

4. The continuously variable transmission of claim 3, further comprising a controller and a gear selector in communication with the controller, the controller is in communication with the brake and the forward clutch, the gear selector has a forward state, a reverse state, and a neutral state.

5. The continuously variable transmission of claim 4, wherein:
   the controller is programmed to determine that the gear selector is in the forward state;
   in response to determining that the gear selector is in the forward state, the controller is programmed to command:
     the brake to be in the disengaged state; and
     the forward clutch to be in the engaged state.

6. The continuously variable transmission of claim 5, wherein the controller is programmed to:
   determine that the forward clutch is slipping; and
   in response to determining that the forward clutch is slipping, the controller is programmed to command the forward clutch to increase a clamping force thereof.

7. The continuously variable transmission of claim 5, wherein the controller is programmed to:
   determine that the forward clutch is not slipping; and
   in response to determining that the forward clutch is not slipping, the controller is programmed to adjust a clamping force exerted on the variator assembly such that a safety factor of the continuously variable transmission is greater than a safety factor of the forward clutch.

8. The continuously variable transmission of claim 4, wherein:
   the controller is programmed to determine that the gear selector is in the reverse state;
   in response to determining that the gear selector is in the reverse state, the controller is programmed to command:
   the brake to be in the engaged state; and
   the forward clutch to be in the disengaged state.

9. The continuously variable transmission of claim 4, wherein:
   the controller is programmed to determine that the gear selector is in the reverse state;
   in response to determining that the gear selector is in the reverse state, the controller is programmed to command:
   the brake to be in the disengaged state; and
   the forward clutch to be in the disengaged state.

* * * * *